(12) United States Patent
Furuya et al.

(10) Patent No.: US 10,432,899 B2
(45) Date of Patent: Oct. 1, 2019

(54) IMAGE DISPLAY DEVICE

(71) Applicant: Panasonic Intellectual Property Management Co., Ltd., Osaka (JP)

(72) Inventors: Hiroyuki Furuya, Osaka (JP); Akira Kurozuka, Osaka (JP); Yuta Yamamoto, Kyoto (JP); Susumu Uragami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/001,469

(22) Filed: Jun. 6, 2018

(65) Prior Publication Data

US 2018/0374407 A1    Dec. 27, 2018

(30) Foreign Application Priority Data

Jun. 23, 2017 (JP) .................. 2017-123663

(51) Int. Cl.
| | |
|---|---|
| *H04N 9/31* | (2006.01) |
| *G09G 3/02* | (2006.01) |
| *B60K 35/00* | (2006.01) |
| *G02B 27/01* | (2006.01) |
| *G09G 3/00* | (2006.01) |

(Continued)

(52) U.S. Cl.
CPC .......... *H04N 9/3129* (2013.01); *B60K 35/00* (2013.01); *G02B 27/0101* (2013.01); *G03B 21/602* (2013.01); *G03B 21/625* (2013.01); *G09G 3/001* (2013.01); *G09G 3/025* (2013.01); *B60K 2370/333* (2019.05); *B60K 2370/334* (2019.05); *B60K 2370/52* (2019.05); *G02B 2027/011* (2013.01); *G09G 2380/10* (2013.01); *H04N 9/3108* (2013.01); *H04N 9/3135* (2013.01);

(Continued)

(58) Field of Classification Search
CPC .. H04N 9/3129; H04N 9/3132; H04N 9/3135; G02B 27/0101; G02B 2027/0114
See application file for complete search history.

(56) References Cited

U.S. PATENT DOCUMENTS 7,940,442 B2 *  5/2011  Yamagishi ......... G02B 26/0891
                                                                359/209.1
9,798,153 B2 * 10/2017  Ide ....................... G02B 3/0056
(Continued)

FOREIGN PATENT DOCUMENTS

JP    2014-235268    12/2014

*Primary Examiner* — Gene W Lee
(74) *Attorney, Agent, or Firm* — McDermott Will & Emery LLP

(57) ABSTRACT

Provided is an image display device capable of effectively enhancing image quality of a display image with a simple configuration. The image display device includes a light source, a screen configured to be two-dimensionally scanned with laser light to draw an image on the screen, a scanning unit configured to scan the screen with the laser light, a mirror drive circuit configured to drive the scanning unit, and an optical system configured to generate a virtual image of the image drawn on the screen. On the screen, a plurality of lens regions are arranged so as to individually line up in two directions different from each other. Rows of the lens regions in one of the two directions are inclined relatively at a predetermined inclination angle with respect to main scan directions of the laser light to the screen.

7 Claims, 17 Drawing Sheets

(51) Int. Cl.
*G03B 21/602* (2014.01)
*G03B 21/625* (2014.01)

(52) U.S. Cl.
CPC ......... *H04N 9/3155* (2013.01); *H04N 9/3161* (2013.01); *H04N 9/3164* (2013.01)

(56) References Cited

U.S. PATENT DOCUMENTS

| | | | |
|---|---|---|---|
| 9,835,859 B2* | 12/2017 | Furuya | G02B 27/104 |
| 2017/0059861 A1* | 3/2017 | Furuya | G02B 27/104 |
| 2017/0146809 A1* | 5/2017 | Furuya | G03B 21/625 |
| 2017/0315353 A1* | 11/2017 | Saisho | G02B 26/101 |

* cited by examiner

LASER LIGHT

IMAGE DISPLAY DEVICE

BACKGROUND

1. Technical Field

The present disclosure relates to an image display device, and, for example, to an image display device preferable for being mounted on a moving body such as a passenger vehicle.

2. Description of the Related Art

In recent years, an image display device called a head-up display has been developed, and the head-up display has been mounted on a moving body such as a passenger vehicle. In the head-up display mounted on the passenger vehicle, light modulated by image information is projected toward a windshield (a windscreen), and the light reflected by the windshield is applied to driver's eyes. This allows the driver to see a virtual image of an image in front of the windshield. For example, a vehicle speed, an outside air temperature or the like is displayed as the virtual image.

In the head-up display, a laser light source can be used as a light source. In this case, laser light scans a screen while being modulated in response to a video signal. Thereafter, the laser light is diffused on the screen, and is guided to an eye box near the driver's eyes. This allows the driver to see the image (the virtual image) satisfactorily and stably even if he/she moves a head to some extent. The eye box has, for example, an oblong rectangular shape.

PTL 1 listed below describes an image display device in which a screen is configured of a microlens array having a plurality of microlenses arrayed thereon. Here, a pitch in a horizontal direction of the microlens array is adjusted to be larger than a beam diameter in the horizontal direction of the laser light entering the microlens array, and a pitch in a vertical direction of the microlens array is adjusted to be not larger than a beam diameter in the vertical direction of the laser light entering the microlens array.

CITATION LIST

Patent Literature

PTL 1: Unexamined Japanese Patent Publication No. 2014-235268

SUMMARY

As described in the PTL 1, a pitch of a microlens array is made larger than a beam diameter of laser light, which can suppress speckle caused in an image. However, in the image display device using the method of scanning a screen with the laser light, only adjusting the pitch of the microlens array may cause an interference fringe or the like in the image, and thus deteriorate image quality.

In light of the above-described problem, an object of the present disclosure is to provide an image display device capable of effectively enhancing image quality of a display image with a simple configuration.

A first aspect of the present disclosure relates to an image display device. The image display device according to the present aspect includes: a light source; a screen; a scanning unit; a drive unit; and an optical system. The light source emits laser light. The screen is two-dimensionally scanned with the laser light to draw an image on the screen. The scanning unit scans the screen with the laser light. The drive unit drives the scanning unit so that the laser light moves on the screen along a plurality of scan lines at predetermined intervals. The optical system generates a virtual image of the image drawn on the screen. On the screen, a plurality of lens regions are arranged so as to individually line up in two directions different from each other. Rows of the lens regions in one of the two directions are inclined relatively at a predetermined inclination angle with respect to main scan directions of the laser light to the screen.

According to the image display device according to the present aspect, by setting the inclination angle of the rows of the lens regions in the one of the two directions with respect to the main scan directions to a predetermined value, an interference fringe caused in the image can be effectively suppressed. Thus, the extremely simple configuration can effectively enhance the image quality of the display image.

A second aspect of the present disclosure relates to an image display device. The image display device according to the present aspect includes: a light source; a screen; a scanning unit; a drive unit; and an optical system. The light source emits laser light. The screen is two-dimensionally scanned with the laser light to draw an image on the screen. The scanning unit scans the screen with the laser light. The drive unit drives the scanning unit so that the laser light moves on the screen along a plurality of scan lines at predetermined intervals. The optical system generates a virtual image of the image drawn on the screen. The screen includes a plurality of first lens portions extending in a first direction in one of an incident surface and an emission surface of the laser light, the plurality of first lens portions being configured to diverge the laser light only in a direction perpendicular to the first direction. The screen includes a plurality of second lens portions extending in a second direction different from the first direction in the other of the incident surface and the emission surface of the laser light, the plurality of second lens portions being configured to diverge the laser light only in a direction perpendicular to the second direction. With regard to at least one of the first lens portions and the second lens portions, tops of the relevant adjacent lens portions are displaced mutually by a predetermined distance in a thickness direction of the screen.

According to the image display device according to the present aspect, setting the displacement distance of the relevant adjacent portions to a predetermined value can effectively suppress regions each having a low light quantity, which are caused at boundaries of the relevant lens portions. Thus, the simple configuration can effectively enhance the image quality of the display image.

As described above, according to the present disclosure, the simple configuration can effectively enhance display image quality.

Effects or meanings of the present disclosure will be further clarified in the following description of the exemplary embodiments. However, the exemplary embodiments described below are merely examples in carrying out the present disclosure, and the present disclosure is not at all limited to the examples described in the following exemplary embodiments.

DETAILED DESCRIPTION

Exemplary embodiments of the present disclosure will now be described with reference to the drawings. For convenience, X, Y and Z-axes perpendicular to one another are added to the respective drawings as appropriate.

Figure 1A:
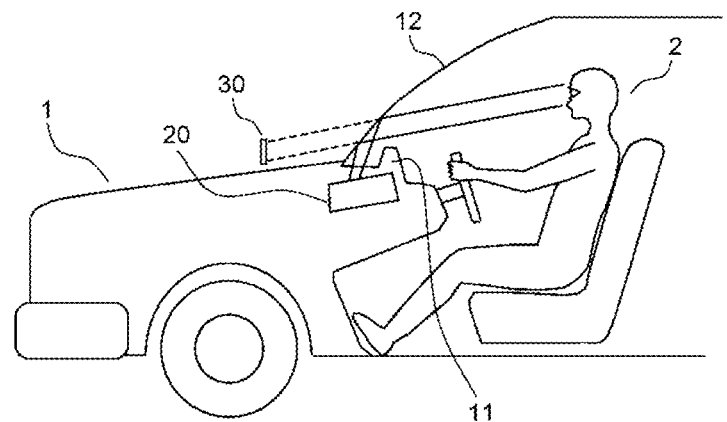
FIG. 1A is a view schematically showing a usage form of an image display device according to an exemplary embodiment.
Figure 1B:
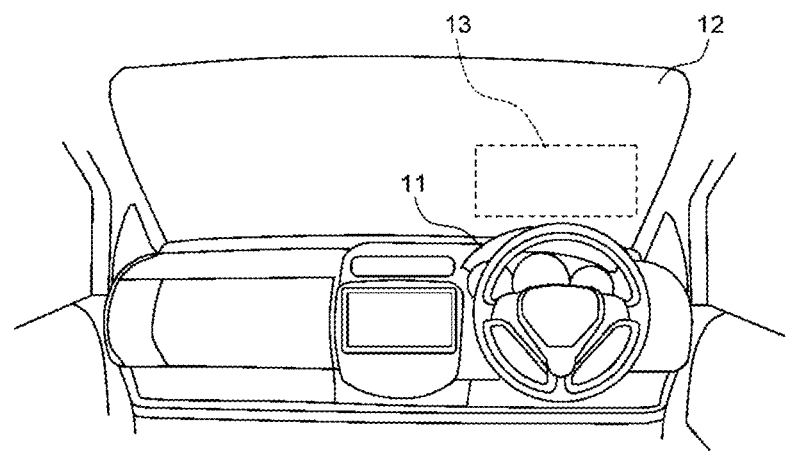
FIG. 1B is a view schematically showing the usage form of the image display device according to the exemplary embodiment.

FIGS. 1A and 1B are views schematically showing a usage form of image display device 20. FIG. 1A is a view schematically showing, in a see-through manner, an inside of passenger vehicle 1 as seen from a side of passenger vehicle 1, and FIG. 1B is a view of a front of passenger vehicle 1 in a driving direction as seen from the inside of passenger vehicle 1.

In the present exemplary embodiment, the present disclosure is applied to an on-vehicle head-up display. As shown in FIG. 1A, image display device 20 is installed inside dashboard 11 of passenger vehicle 1.

As shown in FIG. 1A and FIG. 1B, image display device 20 projects light, which is modulated by a video signal, onto projection region 13 near a driver's seat on a lower side of windshield 12. The projected light is reflected by projection region 13, and is applied to an oblong region (an eye-box region) around a position of driver 2's eyes. This allows predetermined image 30 to be displayed as a virtual image in a viewing field in front of driver 2. Therefore, driver 2 can view image 30 as the virtual image so as to be superimposed on a scene in front of windshield 12. In other words, image display device 20 forms image 30 as the virtual image, in a space in front of projection region 13 of windshield 12.

Figure 1C:
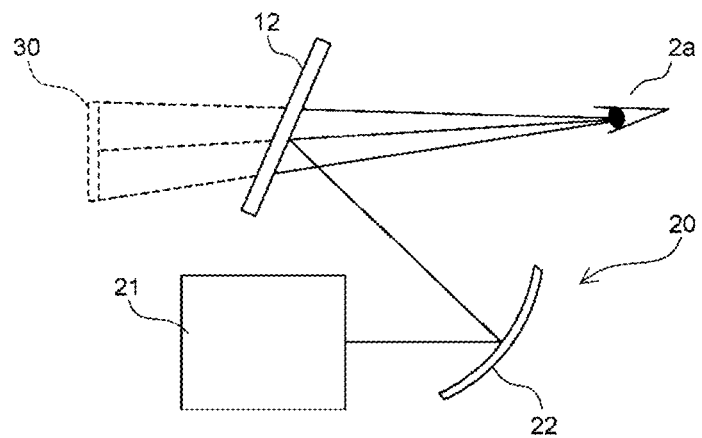
FIG. 1C is a view schematically showing a configuration of the image display device according to the exemplary embodiment.

FIG. 1C is a view schematically showing a configuration of image display device 20.

Image display device 20 includes irradiation light generator 21 and mirror 22. Irradiation light generator 21 emits light modulated by the video signal. Mirror 22 has a curved reflecting surface, and reflects, toward windshield 12, the light emitted from irradiation light generator 21. The light reflected by windshield 12 is applied to eye 2a of driver 2. An optical system of irradiation light generator 21 and mirror 22 are designed such that image 30 as the virtual image can be displayed in a predetermined size in front of windshield 12.

Mirror 22 configures an optical system for generating the virtual image by using light from screen 108 described later. This optical system does not necessarily have to be configured of mirror 22 only. For example, this optical system may include a plurality of mirrors, and may include a lens or the like.

Figure 2:
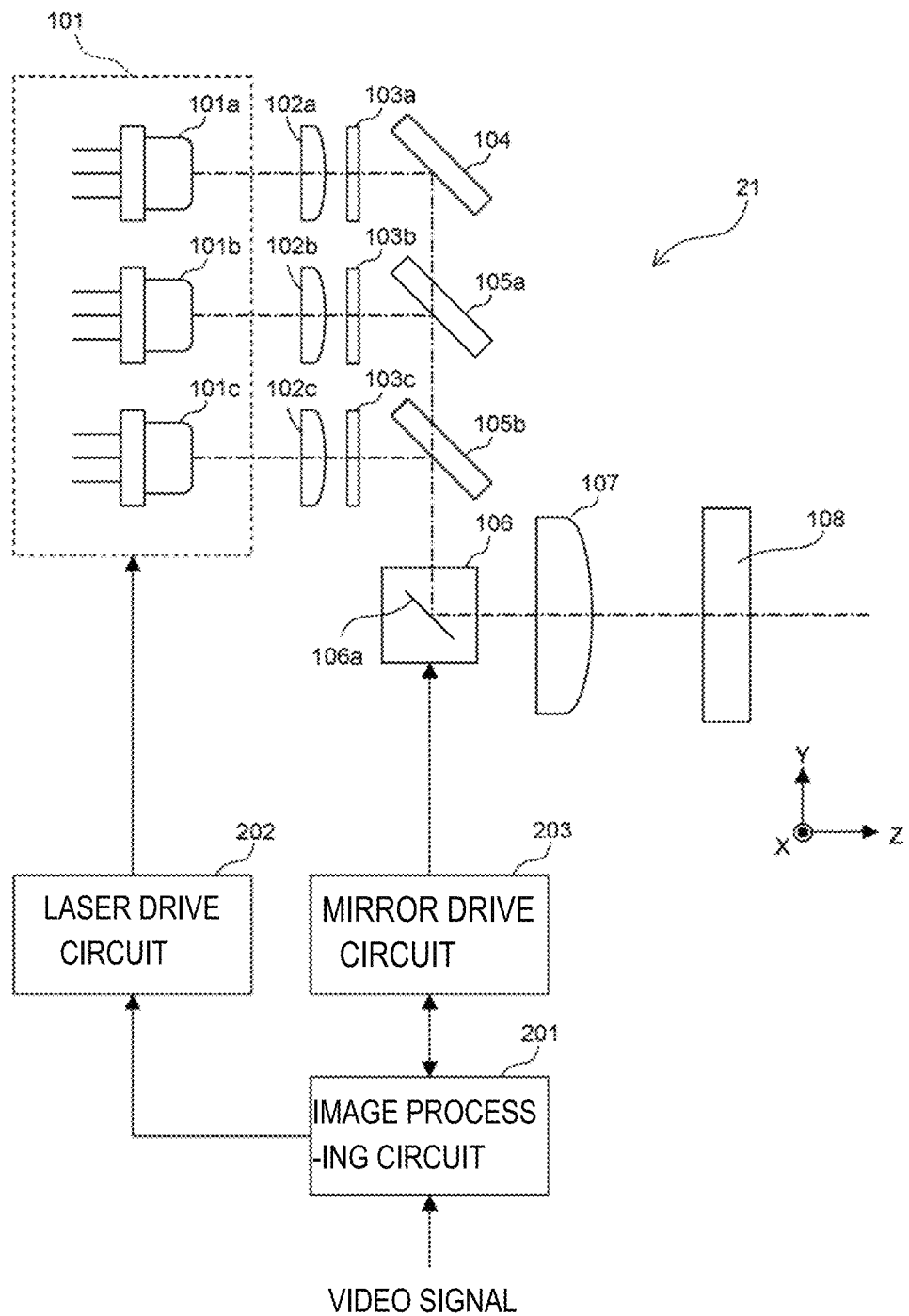
FIG. 2 is a diagram of an irradiation light generator and a circuit used in the irradiation light generator in the image display device according to the exemplary embodiment.

FIG. 2 is a diagram showing a configuration of irradiation light generator 21 in image display device 20 and a circuit configuration used in irradiation light generator 21.

Irradiation light generator 21 includes light source 101, collimator lenses 102a to 102c, apertures 103a to 103c, mirror 104, dichroic mirrors 105a and 105b, scanning unit 106, correction lens 107, and screen 108.

Light source 101 includes three laser light sources 101a to 101c.

Laser light source 101a emits laser light having a red wavelength included in a range of 600 nm to 660 nm, laser light source 101b emits laser light having a green wavelength included in a range of 500 nm to 550 nm, and laser light source 101c emits laser light having a blue wavelength included in a range of 450 nm to 480 nm. In the present exemplary embodiment, in order to display a color image as image 30, light source 101 includes these three laser light sources 101a to 101c. When a monochromatic image is displayed as image 30, light source 101 may include only one laser light source corresponding to a color of the image. Laser light sources 101a to 101c are made of, for example, semiconductor lasers.

The laser light emitted from laser light sources 101a to 101c is converted into parallel light by collimator lenses 102a to 102c. The laser light transmitted through collimator lenses 102a to 102c is shaped into circular beams of substantially the same size by apertures 103a to 103c. That is, apertures 103a to 103c configure beam shapers for aligning beam sizes and beam shapes of the laser light individually emitted from laser light sources 101a to 101c.

In place of collimator lenses 102a to 102c, shaping lenses may be used, each of which shapes the laser light into a circular beam shape and collimates the laser light. In this case, the apertures can be omitted.

Thereafter, with regard to the laser light of the respective colors emitted from laser light sources 101a to 101c, optical axes are aligned with one another by mirror 104 and two dichroic mirrors 105a, 105b. Mirror 104 substantially totally reflects the red laser light transmitted through collimator lens 102a. Dichroic mirror 105a reflects the green laser light transmitted through the collimator lens 102b, and transmits the red laser light reflected by mirror 104. Dichroic mirror 105b reflects the blue laser light transmitted through collimator lens 102c, and transmits the red laser light and the green laser light, which have passed through dichroic mirror 105a. Mirror 104 and two dichroic mirrors 105a, 105b are disposed so as to align the optical axes of the laser light of the respective colors emitted from laser light sources 101b, 101c.

Scanning unit 106 reflects the laser light of the respective colors having passed through dichroic mirror 105b. Scanning unit 106 is made of, for example, a micro electro mechanical system (MEMS) mirror, and includes a configuration to rotate mirror 106a, which the laser light of each of the colors having passed through dichroic mirror 105b enters, around an axis parallel to an X axis and an axis perpendicular to the X axis and parallel to a reflecting surface of mirror 106a in response to a drive signal. Rotating mirror 106a as described above allows a reflection direction of the laser light to change in a direction parallel to an X-Z plane and a direction parallel to a Y-Z plane. This allows screen 108 to be two-dimensionally scanned with the laser light of the respective colors, as will be described later.

While scanning unit 106 is configured of the MEMS mirror of a two-axis driving system here, scanning unit 106 may have another configuration. For example, scanning unit 106 may be configured by combining a mirror configured to be rotationally driven around the axis parallel to the X-axis, and a mirror configured to be rotationally driven around the axis perpendicular to the X axis and parallel to the reflecting surface of mirror 106a.

Correction lens 107 is designed to direct the laser light of each of the colors in a Z-axis positive direction regardless of a swing angle of the laser light deflected by scanning unit 106. Correction lens 107 is designed so that a focal depth near screen 108 is about 3 mm to 5 mm. Correction lens 107 is configured, for example, by combining a plurality of lenses.

An image is formed on screen 108 by scanning screen 108 with the laser light, and screen 108 has a function of diffusing the incident laser light to the region (the eye-box region) around the position of eye 2a of driver 2. Screen 108 is made of a transparent resin such as polyethylene terephthalate (PET). A configuration of screen 108 will be described later with reference to FIG. 3A to FIG. 5A.

Image processing circuit 201 includes an arithmetic processing unit such as a central processing unit (CPU) and a memory, processes the video signal input thereto, and controls laser drive circuit 202 and mirror drive circuit 203. Laser drive circuit 202 changes emission intensities of laser light sources 101a to 101c in response to a control signal from image processing circuit 201. Mirror drive circuit 203 drives mirror 106a of scanning unit 106 in response to the control signal from image processing circuit 201. Control in image processing circuit 201 during image display operation will be described later with reference to FIG. 5B.

Figure 3A:
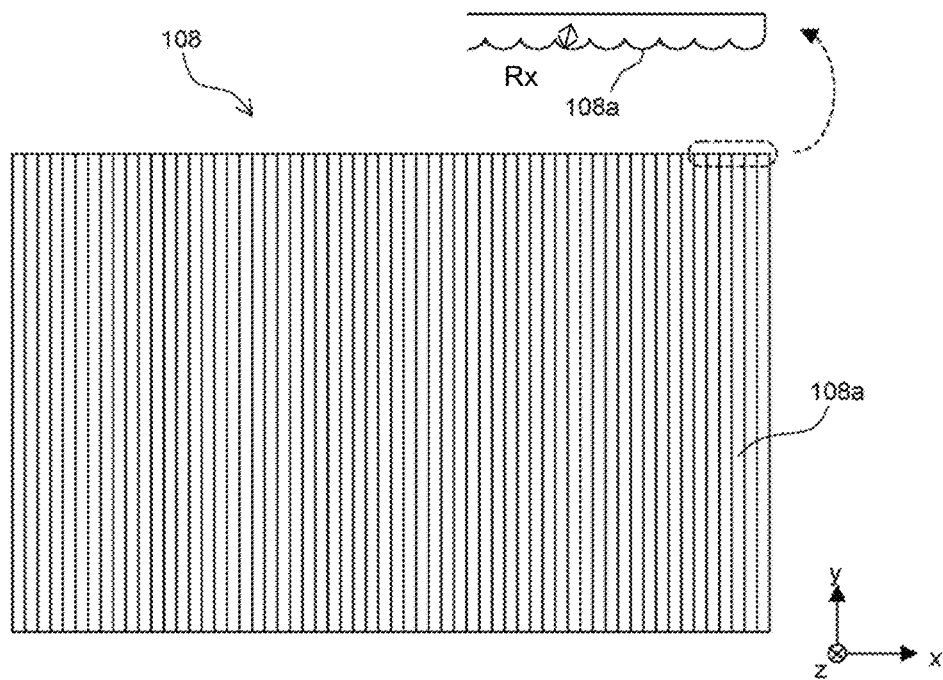
FIG. 3A is a view schematically showing a state of a screen according to the exemplary embodiment as seen from an incident side of laser light.
Figure 3B:
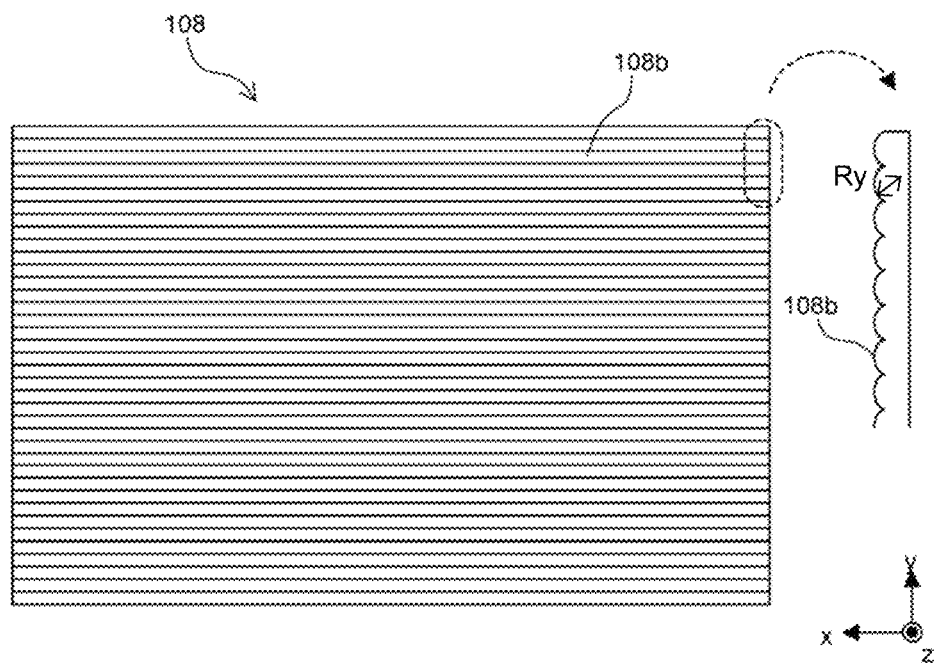
FIG. 3B is a view schematically showing a state of the screen according to the exemplary embodiment as seen from an emission side of the laser light.

FIG. 3A and FIG. 3B are views schematically showing a state of screen 108 as seen from an incident side and an emission side of the laser light, respectively. X, Y and Z-axes perpendicular to one another are newly added to FIG. 3A and FIG. 3B. An X-axis direction, a Y-axis direction, and a Z-axis direction denote a longitudinal direction (a horizontal direction), a short direction (a vertical direction), and a thickness direction of screen 108, respectively. The Z-axis direction is parallel to a Z-axis direction shown in FIG. 2.

On an upper side of FIG. 3A, an enlarged view of a vicinity of a corner of screen 108 surrounded by a broken line as seen from a Y-axis positive side is schematically shown. Moreover, on a right side of FIG. 3B, an enlarged view of a vicinity of a corner of screen 108 surrounded by a broken line as seen from an X-axis negative side is schematically shown.

As shown in FIG. 3A, a plurality of first lens portions 108a for diverging the laser light in the X-axis direction are formed on a surface on a laser light incident side of screen 108 so as to be arrayed at a constant pitch in the X-axis direction. First lens portions 108a extend in parallel to the Y-axis direction. A shape of each of first lens portions 108a as seen in the Y-axis direction is a substantially circular arc shape. A width in the X-axis direction of each of first lens portions 108a (the pitch of first lens portions 108a) is, for example, 50 µm.

As shown in FIG. 3B, a plurality of second lens portions 108b for diverging the laser light in the Y-axis direction are formed on a surface on a laser light emission side of screen 108 so as to be arrayed at a constant pitch in the Y-axis direction. Second lens portions 108b extend in parallel to the X-axis direction. A shape of each of second lens portions 108b as seen in the X-axis direction is a substantially circular arc shape. A width in the Y-axis direction of each of second lens portions 108b (a pitch of second lens portions 108b) is, for example, 70 µm. The width in the Y-axis direction of each of second lens portions 108b may be the same as the width in the X-axis direction of each of first lens portions 108a.

Figure 4:
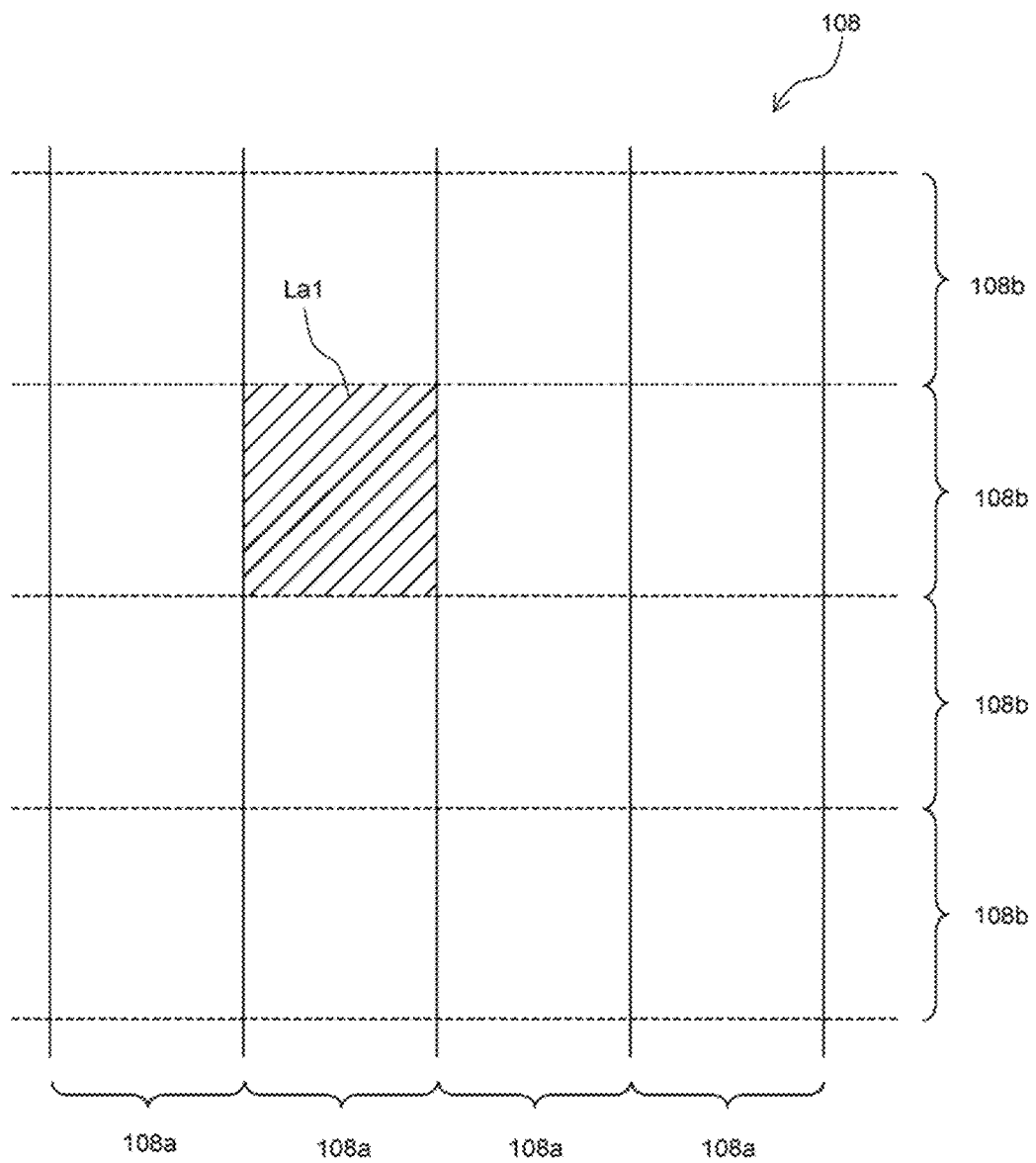
FIG. 4 is a partially enlarged view of the screen according to the exemplary embodiment.

FIG. 4 is a partially enlarged view of screen 108. FIG. 4 shows partially enlarged screen 108 when screen 108 is seen in the incident direction of the laser light (that is, in the Z-axis positive direction). In FIG. 4, solid lines indicate boundaries of first lens portions 108a, and broken lines indicate boundaries of second lens portions 108b.

As shown in FIG. 4, when seen in the incident direction of the laser light (that is, in the Z-axis positive direction), a region where each of first lens portions 108a and each of second lens portions 108b overlap each other (that is, a hatched region) configures one lens region La1. Lens regions La1 line up in the X-axis direction and in the Y-axis direction. The laser light entering each of lens regions La1 is diffused after being converged in the X-axis direction by first lens portion 108a, and is diffused after being converged in the Y-axis direction by second lens portion 108b. In this way, the laser light entering each of lens regions La1 is guided to the oblong region (the eye-box region) around the position of eye 2a of driver 2.

Here, curvature radius Rx of each of first lens portions 108a and curvature radius Ry of each of second lens portions 108b are different from each other. Curvature radius Rx is set smaller than curvature radius Ry. Accordingly, a divergence angle of the laser light diverged after the laser light is converged by first lens portions 108a becomes larger than a divergence angle of the laser light diverged after the laser light is converged by second lens portions 108b. By setting the curvatures of first lens portions 108a and second lens portions 108b as described above, the laser light transmitted through screen 108 can be guided to the oblong region (the eye-box region) around the position of eye 2a of driver 2.

The curvature radii of first lens portions 108a and second lens portions 108b are determined in accordance with a shape of the eye-box region.

Figure 5A:
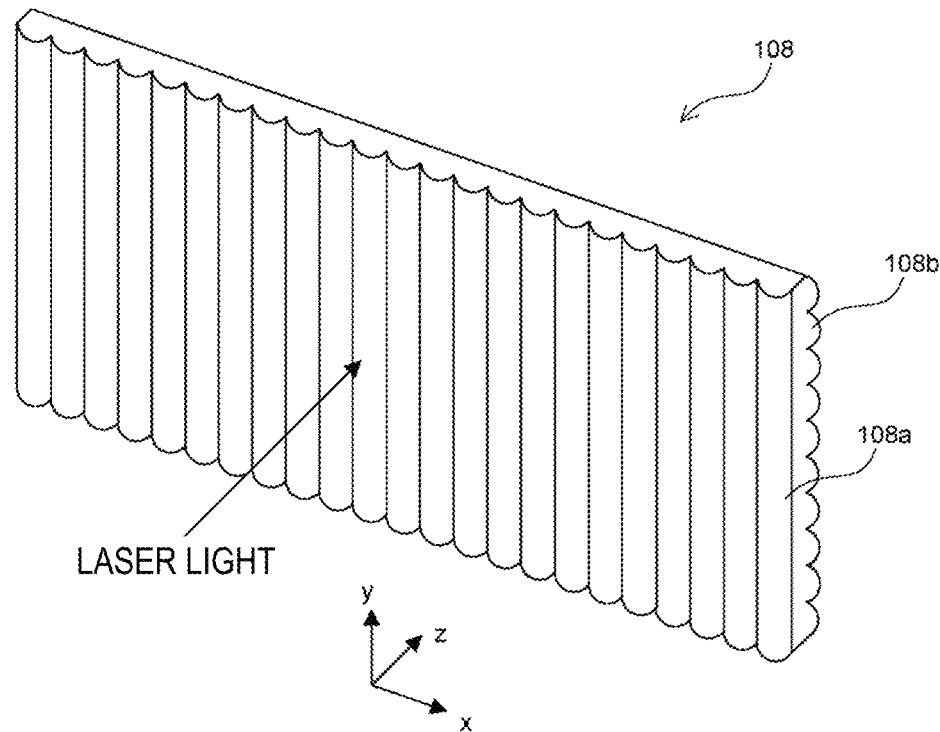
FIG. 5A is a perspective view schematically showing an incident state of the laser light to the screen according to the exemplary embodiment.
Figure 5B:
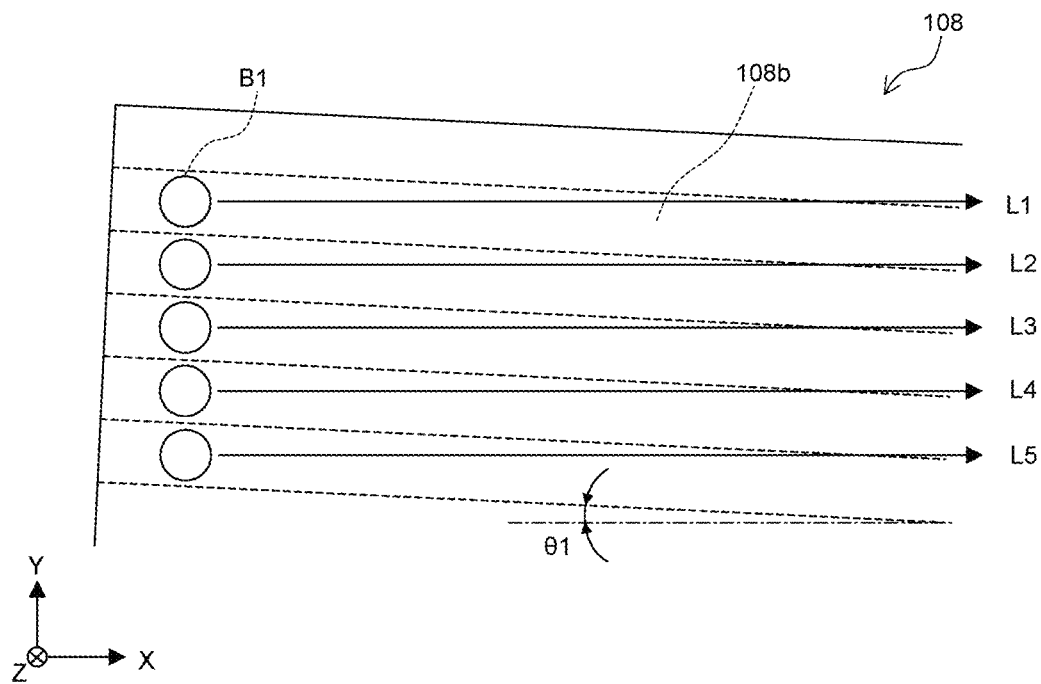
FIG. 5B is a view schematically showing a relation between the screen according to the exemplary embodiment and scan lines.

FIG. 5A is a perspective view schematically showing a configuration of screen 108. FIG. 5B is a view schematically showing a relation between screen 108 and scan lines.

An incident surface (a surface on the Z-axis negative side) of screen 108 having the above-described configuration is scanned with beams B1 in each of which the laser light of the respective colors is superimposed. On the incident surface of screen 108, scan lines L1 to Ln through which beams B1 pass are set beforehand at constant intervals in the Y-axis direction. Start positions of scan lines L1 to Ln coincide with one another in the X-axis direction, and end positions of scan lines L1 to Ln coincide with one another in the X-axis direction. A diameter of beam B1 is set smaller than the width of each of second lens portions 108b. For example, the diameter of beam B1 is set to about 35 µm to 65 µm. In the present exemplary embodiment, the diameter of each of beams B1 is set smaller than not only the width of each of second lens portions 108b but the width of each of first lens portions 108a.

As shown in FIG. 5B, screen 108 is disposed so that second lens portions 108b are inclined at inclination angle θ1 in a direction parallel to an X-Y plane from a state parallel to the X axis. Inclination angle θ1 is set, for example, to about 15°.

Here, a method for disposing screen 108 will be described in more detail with reference to FIG. 6A to FIG. 6C.

Figure 6A:
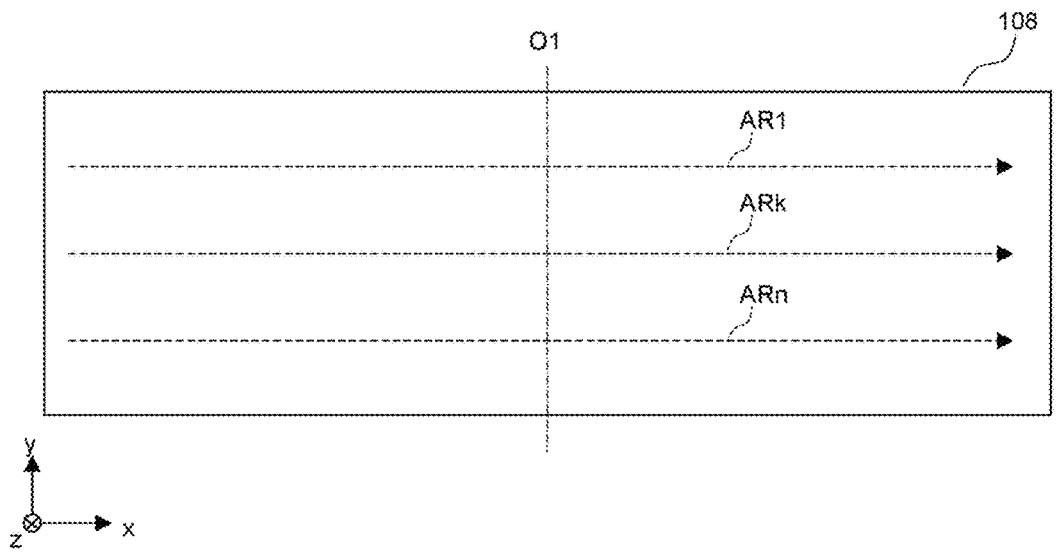
FIG. 6A is a view schematically showing rows of lens regions lining up in a horizontal direction on the screen according to the exemplary embodiment.
Figure 6B:
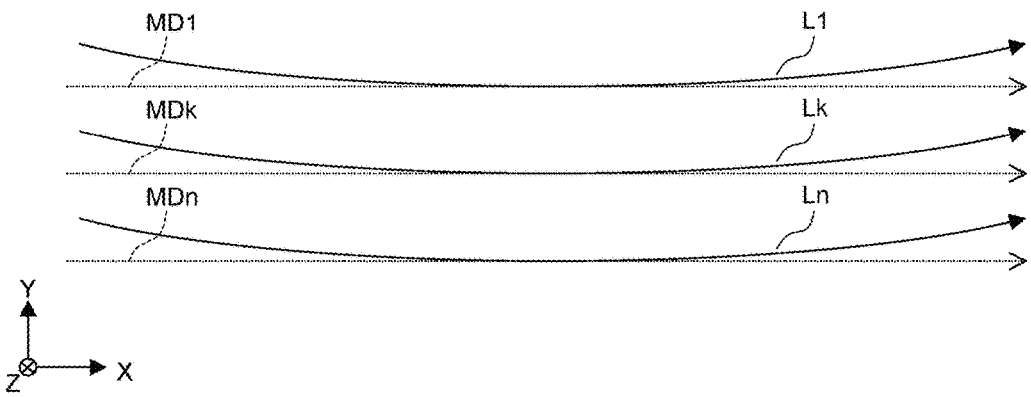
FIG. 6B is a view schematically showing warps of the scan lines with respect to main scan directions, according to the exemplary embodiment.
Figure 6C:
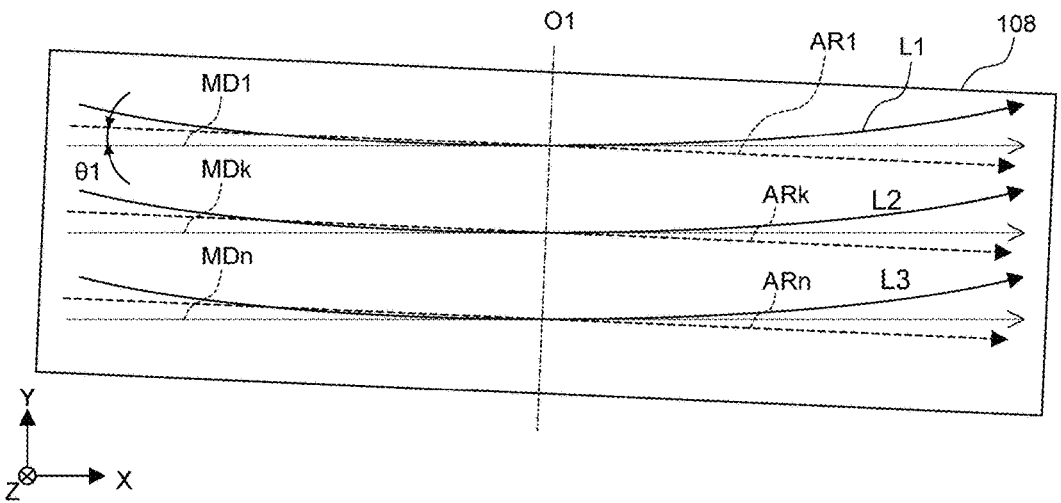
FIG. 6C is a view schematically showing a relation between the screen according to the exemplary embodiment and the scan lines.

FIG. 6A is a view schematically showing rows AR1 to ARn of lens regions La1 lining up in the horizontal direction, FIG. 6B is a view schematically showing warps of scan lines L1 to Ln with respect to main scan direction MD1 to MDn, and FIG. 6C is a view schematically showing a relation between screen 108 and scan lines L1 to Ln.

For convenience, in FIG. 6A and FIG. 6C, only rows AR1, ARk, ARn of lens regions La1 in a top stage, an intermediate stage, and a bottom stage are shown, and in FIG. 6B and FIG. 6C, only scan lines L1, Lk, Ln in a top stage, an intermediate stage, and a bottom stage are shown. In FIG. 6A and FIG. 6C, O1 denotes an intermediate position in the horizontal direction of screen 108.

As shown in FIG. 6B, scan lines L1 to Ln warp so that starting ends and terminal ends shift in a Y-axis positive direction with respect to main scan directions MD1 to MDn of scan lines L1 to Ln. This is attributed to mirror 106a shown in FIG. 2 turned individually around two turning axes (a tilt turning axis, a pan turning axis) perpendicular to each other.

That is, in scanning of each of the scan lines, mirror 106a is turned around the other turning axis (the pan turning axis) in a state where a turning angle to the turning axis (the tilt turning axis) parallel to the X-axis direction is fixed. Change of scan lines L1 to Ln is performed by changing the turning angle of mirror 106a to the tilt turning axis. Thus, turning mirror 106a makes scan lines L1 to Ln warp with respect to main scan directions MD1 to MDn of scan lines L1 to Ln, as shown in FIG. 6B.

Here, main scan directions MD1 to MDn indicate scan directions parallel to a long side of a rectangle when a horizontally-long rectangular drawing region is set in screen 108. In FIG. 6B, main scan directions MD1 to MDn are parallel to the X axis, and correspond to the scan directions of scan lines L1 to Ln when mirror 106a is at a neutral position in the turning direction around the pan turning axis.

As shown in FIG. 6C, screen 108 is disposed so that of rows of lens regions La1 in the horizontal direction (the X-axis direction) and the vertical direction (the Y-axis direction), rows AR1 to ARn in the horizontal direction (the X-axis direction) along scan lines L1 to Ln are relatively inclined at inclination angle θ1 with respect to main scan directions MD1 to MDn. Accordingly, in the present exemplary embodiment, second lens portions 108b are inclined at inclination angle θ1 in the direction parallel to the X-Y plane with respect to main scan directions MD1 to MDn.

In the present exemplary embodiment, disposing screen 108 in the above-described inclined manner can suppress an interference fringe caused in image 30. Effects by the foregoing will now be described with reference to FIG. 7A to FIG. 7C.

<Suppression of Interference Fringe>

The inventors experimentally confirmed the interference fringe caused in image 30 when inclination angle θ1 was changed.

In an experiment, similar to the above-described exemplary embodiment, screen 108 was used, in which first lens portions 108a and second lens portions 108b were formed on an incident surface and an emission surface, respectively.

Conditions of the experiment were set as follows.

Width of first lens portion 108a . . . 50 μm
Width of second lens portion 108b . . . 50 μm
Divergence angle of laser light by first lens portion 108a . . . ±22 degrees
Divergence angle of laser light by second lens portion 108b . . . ±10 degrees
Distance between first lens portion 108a and second lens portion 108b . . . 0.3 mm
Beam diameter on incident surface of screen 108 (in case of a full width at half maximum (FWHM)) . . . 45 μm Among the above-described conditions, with regard to the divergence angle of the laser light, directions away from each other with an optical axis of the laser light as a center were individually defined as positive and negative. Moreover, as screen 108, one was used, in which first lens portions 108a and second lens portions 108b were formed on front and rear surfaces of a sheet having a thickness of 0.3 mm. Accordingly, the distance between first lens portions 108a and second lens portions 108b was 0.3 mm.

In the experiment, white plain image 30 was displayed on image display device 20 having a similar optical system to that in the above-described exemplary embodiment, and image 30 was captured at the position of the eye box. Moreover, image 30 was divided into nine regions in the scan direction to vary a gradation of a luminance of the white plane image on a basis of the region. That is, with a maximum gradation (white) of 255, and a minimum gradation (black) of 0, respective gradations of 0, 31, 63, 95, 127, 159, 191, 223, and 255 were set in the nine regions.

Figure 7A:
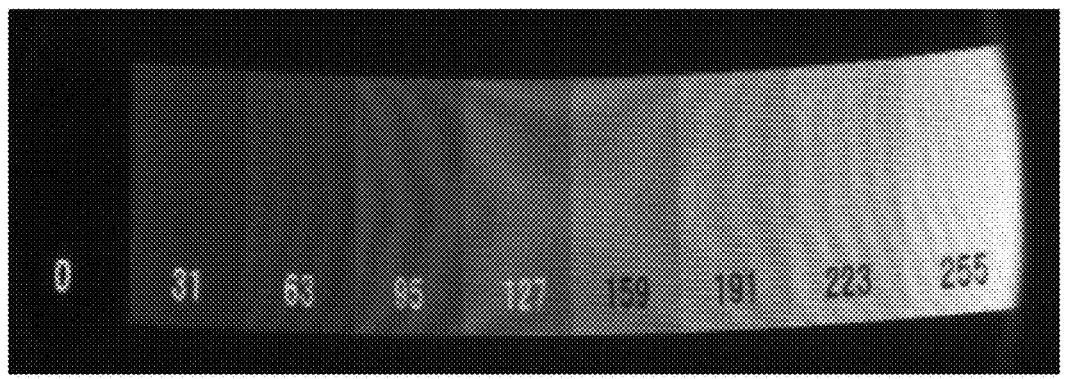
FIG. 7A is a view showing an image when a screen is set by a method for setting the screen according to a comparative example.
Figure 7B:
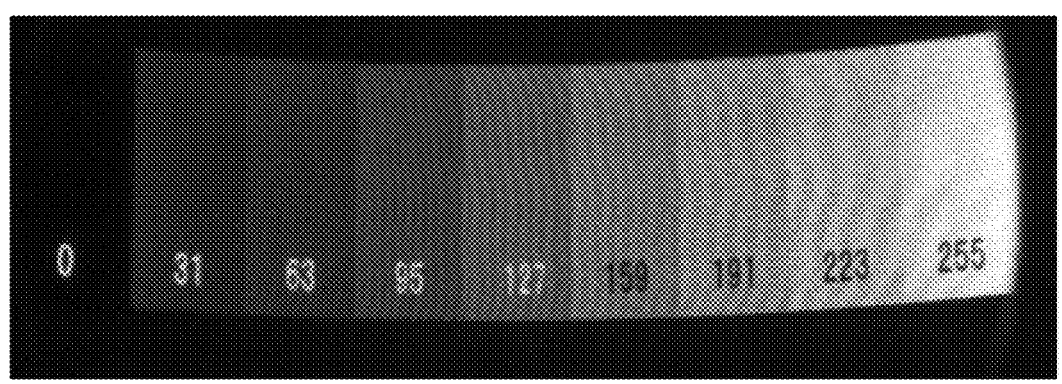
FIG. 7B is a view showing an image when the screen is set by a method for setting the screen according to the exemplary embodiment.
Figure 7C:
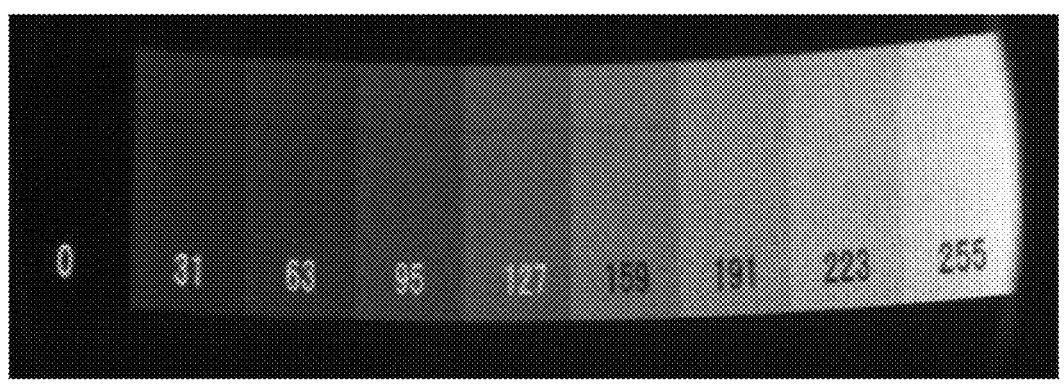
FIG. 7C is a view showing an image when the screen is set by the method for setting the screen according to the exemplary embodiment.

Each of FIG. 7A to FIG. 7C is a picture of an image captured in the present experiment. In each of the pictures, numerical characters each indicating the gradation of the luminance are given to the above-described nine regions. FIG. 7A is a picture of an image captured when inclination angle θ1 was 0° (a comparative example). FIG. 7B is a picture of an image captured when inclination angle θ1 was 10° (an exemplary embodiment). FIG. 7C is a picture of an image captured when inclination angle θ1 was 15° (the exemplary embodiment).

As shown in FIG. 7A, it can be obviously found that when inclination angle θ1 was set to 0°, an interference fringe was obviously caused in the image. Since the scan lines warped with respect to the main scan directions as described above, the image was curved in a similar shape to the scan lines, and the interference fringe caused in the image was curved.

In contrast, as shown in FIG. 7B, when inclination angle θ1 was 10°, a pitch of the interference fringe became narrower than when inclination angle θ1 was 0°, which made the interference fringe inconspicuous. Furthermore, as shown in FIG. 7C, when inclination angle θ1 was 15°, an interval of the interference fringe remarkably became smaller, which brought about a state where the interference fringe could hardly be confirmed.

While in FIG. 7A to FIG. 7C, the respective pictures when inclination angle θ1 was 0°, 10°, 15° are shown, the inventors captured a moving picture of images when inclination angle θ1 was gradually changed from 0°. In this moving picture, with the change in inclination angle θ1, distribution and the pitch of the interference fringe dynamically changed, and at inclination angle θ1 of about 15°, the state where the interference fringe could hardly be confirmed was brought about, as shown in FIG. 7C. From this experiment as well, it can be assumed that even when the condition different from the above-described condition was set, setting inclination angle θ1 to the predetermined angle can effectively suppress the interference fringe up to the state where the interference fringe is almost inconspicuous.

As described above, according to the present exemplary embodiment, disposing screen 108 in the above-described inclined manner can effectively suppress the interference fringe caused in image 30 up to the state where the interference fringe is almost inconspicuous.

<Relation Between Pitch and Inclination Angle>

Next, the inventors verified how inclination angle θ1 of screen 108 that could suppress the interference fringe most changed when pitch P1 of second lens portions 108b changed. As a result, the inventors confirmed that inclination angle θ1 of screen 108 that could suppress the interference fringe most fell within a range of 15° to 20°, inclusive.

It is true of a case where the pitch of second lens portions 108b is fixed, and a pitch between the scan lines is changed. This is because a period and a shade of the interference fringe are attributed to a relation between the pitch between the scan lines, and the pitch of second lens portions 108b.

Each of FIG. 8A to FIG. 8D is a picture showing an image when screen 108 was inclined at inclination angle θ1 that suppressed the interference fringe most in the case where pitch P1 of second lens portions 108b was changed.

Conditions of the present experiment were the same as the conditions of the above-described experiment of the interference fringe except for pitch P1 of second lens portions 108b (the width of second lens portions 108b).

Figure 8A:
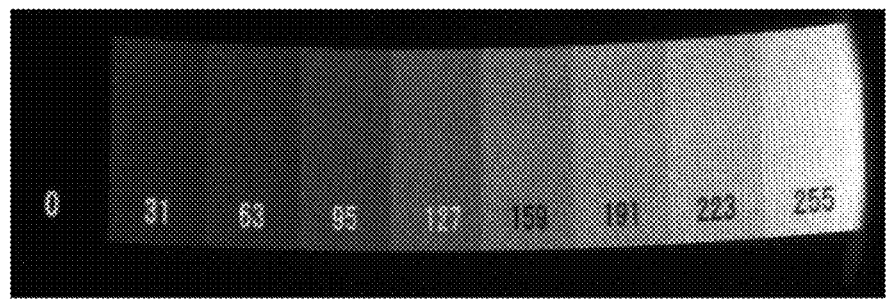
FIG. 8A is a picture showing an image when the screen is inclined at an inclination angle that suppresses an interference fringe most when a pitch of second lens portions is changed, according to the exemplary embodiment.
Figure 8B:
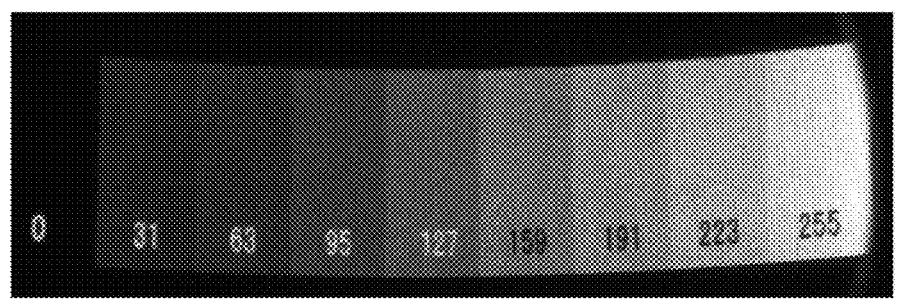
FIG. 8B is a picture showing an image when the screen is inclined at the inclination angle that suppresses the interference fringe most when the pitch of second lens portions is changed, according to the exemplary embodiment.
Figure 8C:
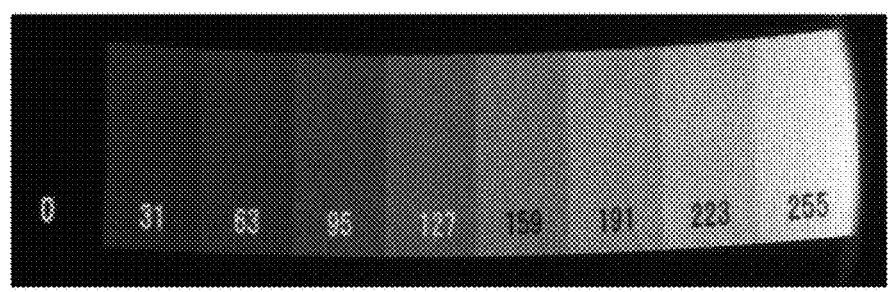
FIG. 8C is a picture showing an image when the screen is inclined at the inclination angle that suppresses the interference fringe most when the pitch of second lens portions is changed, according to the exemplary embodiment.
Figure 8D:
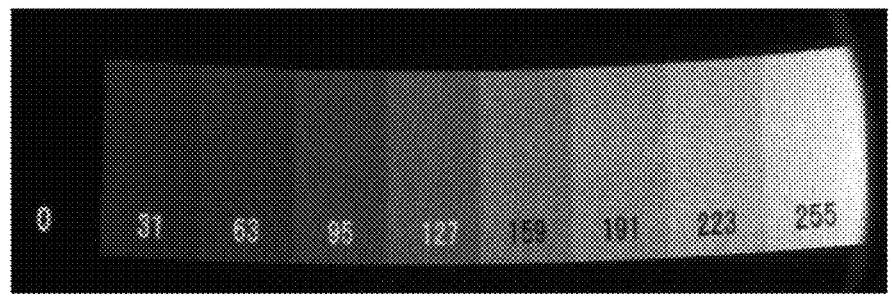
FIG. 8D is a picture showing an image when the screen is inclined at the inclination angle that suppresses the interference fringe most when the pitch of second lens portions is changed, according to the exemplary embodiment.

When pitch P1 was set to 45 μm, 50 μm, 55 μm, and 60 μm, inclination angle θ1 that could suppress the interference fringe most was 18°, 15°, 18°, 20°, respectively. These inclination angles θ1 fell within the range of 15° to 20°, inclusive. Each of FIG. 8A to FIG. 8D shows an image when the screen was inclined at the inclination angle that suppressed the interference fringe most in the case where pitch P1 of the lens portions was changed. FIG. 8A is an image when P1=45 μm, θ1=18°. FIG. 8B is an image when P1=50 μm, θ1=15°. FIG. 8C is an image when P1=55 μm, θ1=18°. FIG. 8D is an image when P1=60 μm, θ1=20°. From FIG. 8A to FIG. 8D, it can be found that the interference fringe was almost eliminated.

The inventors, when confirming more preferable inclination angle θ1 by using still other pitches P1, found that preferable inclination angle θ1 cyclically changed within the range of 15° to 20°, inclusive. Thereby, it could be confirmed that setting inclination angle θ1 of screen 108 to the range of 15° to 20°, inclusive in accordance with pitch P1 of second lens portions 108b could effectively suppress the interference fringe caused in image 30. Accordingly, it can be said that setting inclination angle θ1 of screen 108 to the range of 15° to 20°, inclusive is proper.

<Suppression of Granular Feeling>

Next, the inventors considered granular feeling caused in image 30.

Figure 9A:
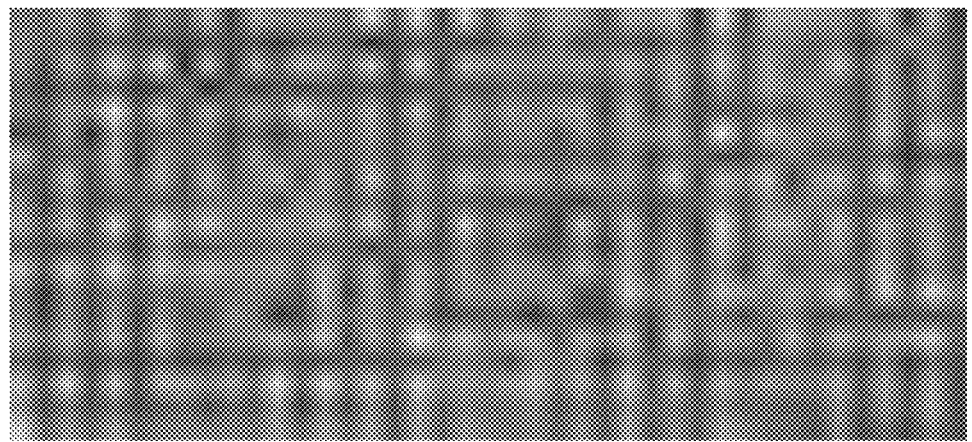
FIG. 9A is a picture showing a partially enlarged image when the screen according to the exemplary embodiment is used.

FIG. 9A is a picture showing a partially enlarged image displayed, using screen 108 shown in the above-described exemplary embodiment. This picture was obtained by capturing an image at the position of the eye box similar to the above-described experiment of the interference fringe. Here, white plain image 30 having a uniform luminance gradation was displayed by image display device 20.

Figure 9B:
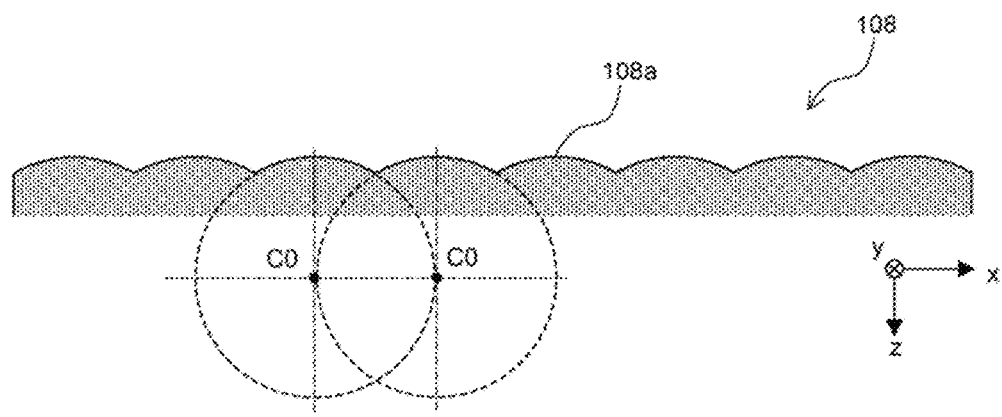
FIG. 9B is a view schematically showing a configuration of the screen according to the exemplary embodiment.

The conditions of screen 108 were similar to the above-described experiment of the interference fringe. In this experiment, inclination angle θ1 was set to 0°. That is, screen 108 was installed without being inclined. Moreover, as shown in FIG. 9B, first lens portions 108a provided in the incident surface of screen 108 were configured so that curvature centers CO of all first lens portions 108a were located at the same position in the Z-axis direction. Moreover, with regard to second lens portions 108b provided in the emission surface of screen 108 as well, lens surfaces of second lens portions 108b were configured so that curvature centers of all second lens portions 108b were located at the same position in the thickness direction (the Z-axis direction) of screen 108. Accordingly, tops of all first lens portions 108a were aligned in the thickness direction of screen 108, and also, tops of all second lens portions 108b were aligned in the thickness direction of screen 108.

When screen 108 configured as described above was used, as shown in FIG. 9A, portions having low luminance were caused in a lattice shape in image 30. These portions having the low luminance caused the granular feeling in image 30, and deteriorated quality of image 30.

The inventors considered that these portions having the low luminance were caused by decrease in intensity of light from screen 108 at a boundary between adjacent first lens portions 108a and a boundary between adjacent second lens portions 108b. Consequently, the inventors considered a configuration for suppressing the decrease in intensity of the light from screen 108 at these boundaries.

Figure 9C:
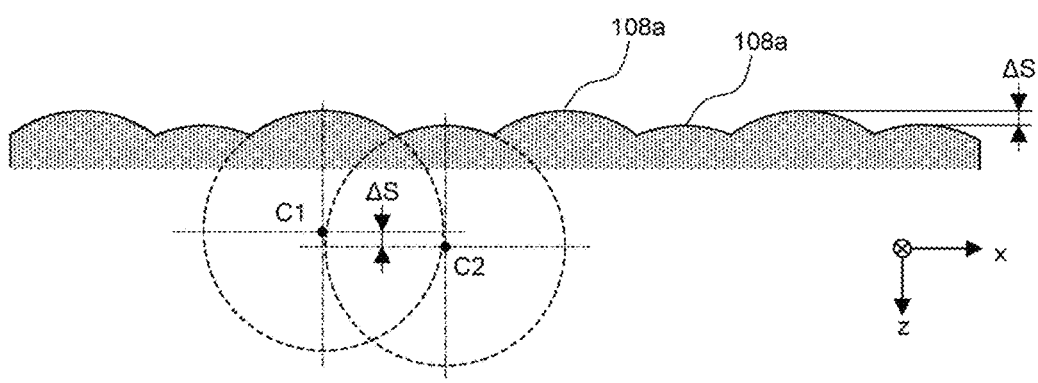
FIG. 9C is a view schematically showing a configuration of an improved screen.

As a result, the inventors have conceived that curvature centers C1, C2 of adjacent first lens portions 108a are mutually displaced in the thickness direction (the Z-axis direction) of screen 108, and similarly, the curvature centers of adjacent second lens portions 108b are also displaced in the thickness direction (the Z-axis direction) of screen 108, as shown in FIG. 9C. That is, the inventors have conceived that the tops of adjacent first lens portions 108a are mutually displaced in the thickness direction (the Z-axis direction) of screen 108, and the tops of adjacent second lens portions 108b are mutually displaced in the thickness direction (the Z-axis direction) of screen 108.

Consequently, the inventors have found, by simulation, how intensity distribution of the light changes in an image surface of an intermediate image generated in the optical system on screen 108 or later when changing displacement distance ΔS of the tops of adjacent first lens portions 108a.

Figure 10A:
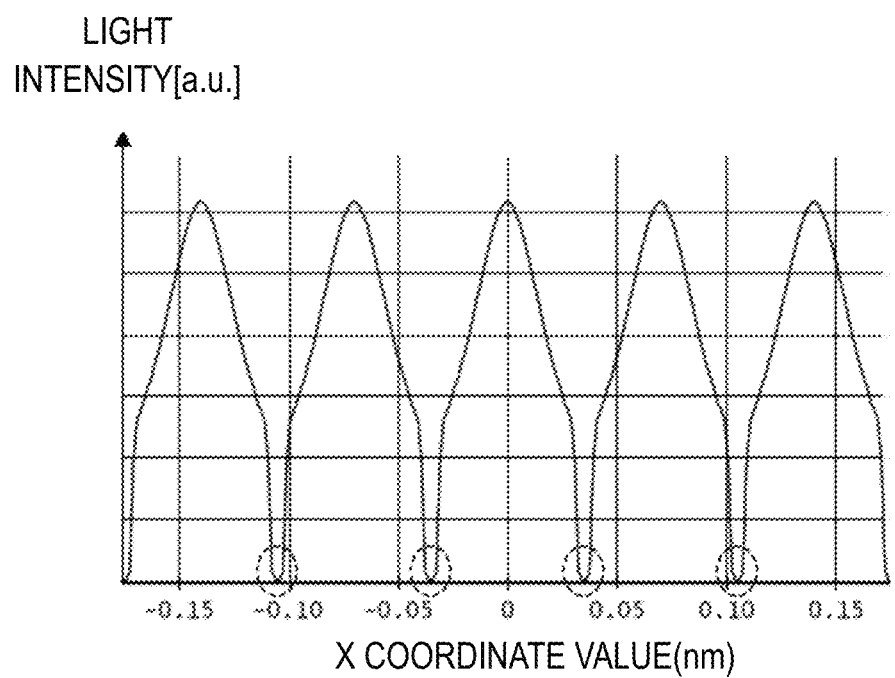
FIG. 10A is a graph resulting from finding, by simulation, intensity distribution of light in an image surface of an intermediate image when the screen in which tops of adjacent first lens portions are aligned in a thickness direction is scanned with the laser light in a horizontal direction.
Figure 10B:
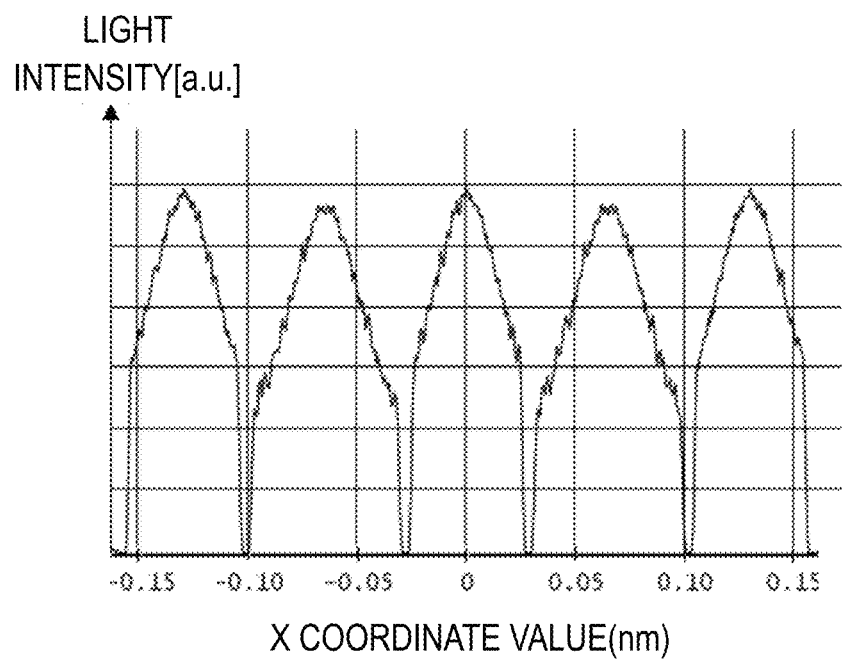
FIG. 10B is a graph resulting from finding, by simulation, the intensity distribution of the light in the image surface of the intermediate image when the screen in which the tops of the adjacent first lens portions are displaced by 5 μm in the thickness direction is scanned with the laser light in the horizontal direction.
Figure 11A:
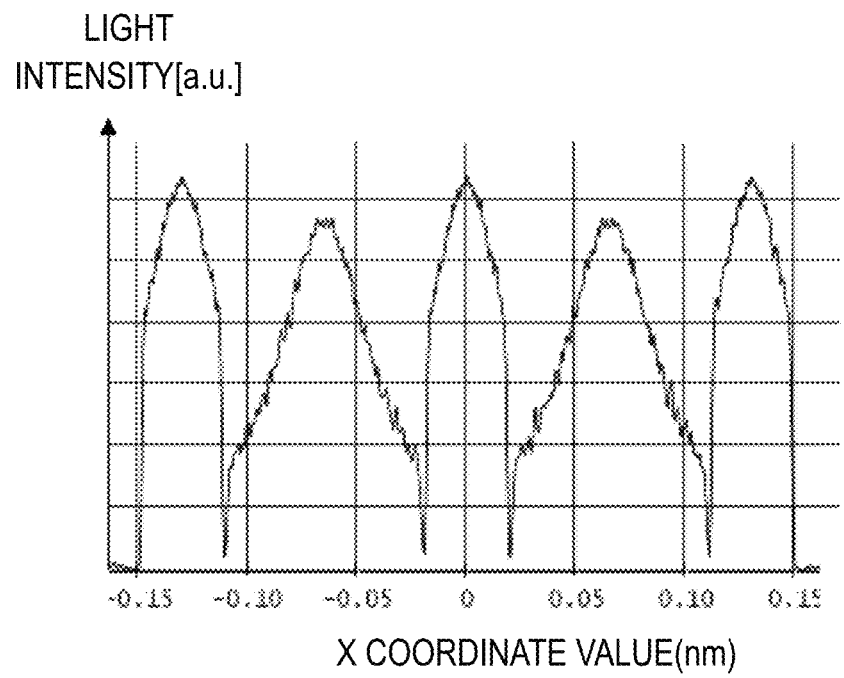
FIG. 11A is a graph resulting from finding, by simulation, the intensity distribution of the light in the image surface of the intermediate image when the screen in which the tops of the adjacent first lens portions are displaced by 10 μm in the thickness direction is scanned with the laser light in the horizontal direction.
Figure 11B:
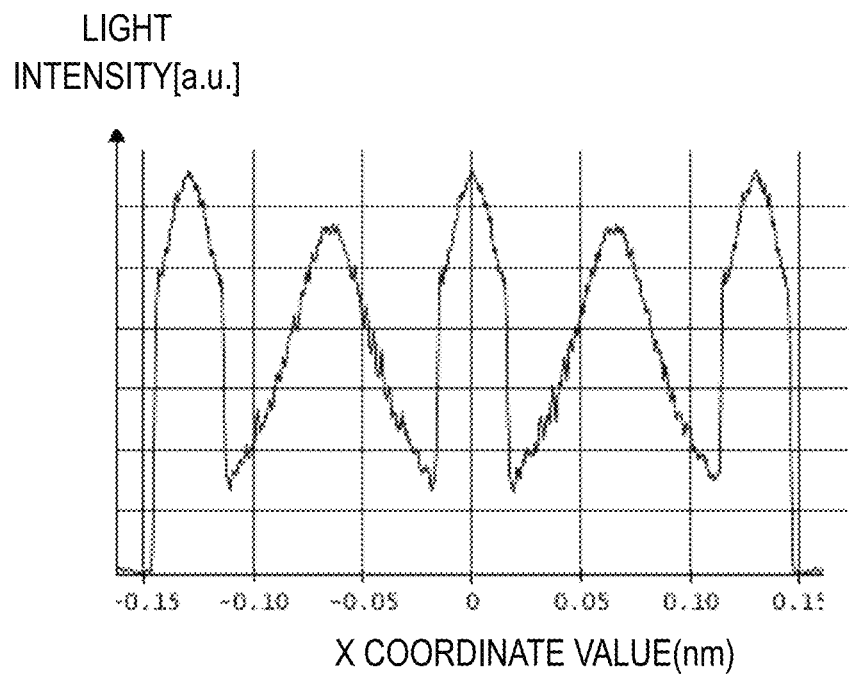
FIG. 11B is a graph resulting from finding, by simulation, the intensity distribution of the light in the image surface of the intermediate image when the screen in which the tops of the adjacent first lens portions are displaced by 15 μm in the thickness direction is scanned with the laser light in the horizontal direction.

FIG. 10A is a graph (a simulation result) showing the intensity distribution of the light in the image surface of the intermediate image when screen 108 with displacement distance ΔS set to 0 μm was scanned with the laser light in the horizontal direction (the X-axis direction). FIG. 10B is a graph (a simulation result) showing the intensity distribution of the light in the image surface of the intermediate image when screen 108 with displacement distance ΔS set to 5 μm was scanned with the laser light in the horizontal direction (the X-axis direction). FIG. 11A is a graph (a simulation result) showing the intensity distribution of the light in the image surface of the intermediate image when screen 108 with displacement distance ΔS set to 10 μm was scanned with the laser light in the horizontal direction (the X-axis direction). FIG. 11B is a graph (a simulation result) showing the intensity distribution of the light in the image surface of the intermediate image when screen 108 with displacement distance ΔS set to 15 μm was scanned with the laser light in the horizontal direction (the X-axis direction).

Here, the intensity distribution by an action of only first lens portions 108a was verified. Moreover, a light intensity when five first lens portions 108a lining up in the horizontal direction (the X-axis direction) were scanned with the laser light was found by simulation. In each of the graphs in FIG. 10A to FIG. 11B, a horizontal axis indicates a position on the image surface corresponding to a scan position of the laser light as an X-coordinate value. Here, a center position in the X-axis direction of central first lens portion 108a of five first lens portions 108a was set as an origin (x=0) of the X-coordinate value in the horizontal axis. In each of the graphs in FIG. 10A to FIG. 11B, a light intensity in a vertical axis indicates an intensity of light in the optical axis center of a beam. A unit of these light intensities is an arbitrary unit (a.u.).

Figure 12A:
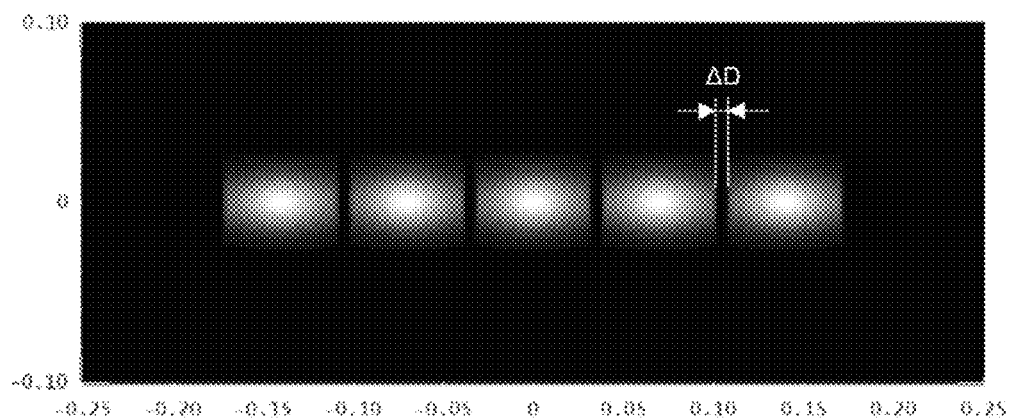
FIG. 12A is a view resulting from developing the intensity distribution of the laser light in the simulation in FIG. 10A on the image surface of the intermediate image.
Figure 12B:
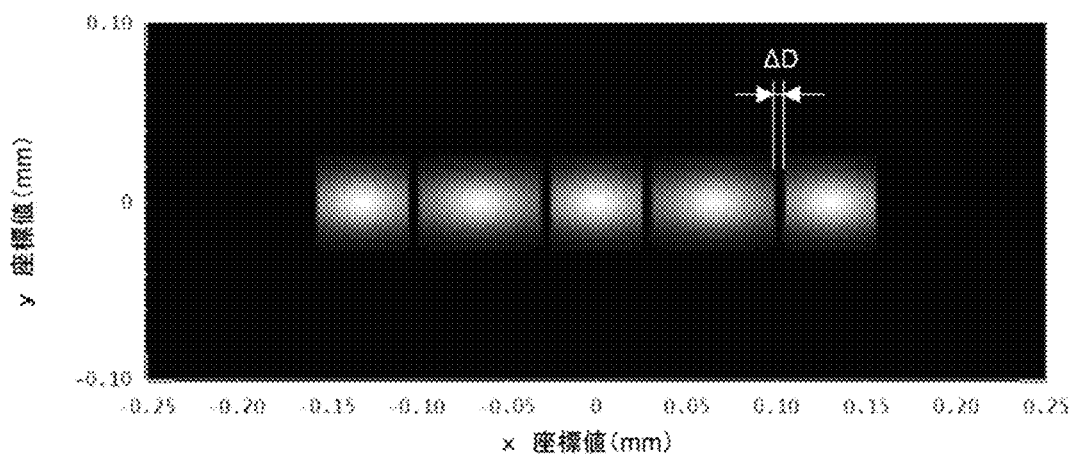
FIG. 12B is a view resulting from developing the intensity distribution of the laser light in the simulation in FIG. 10B on the image surface of the intermediate image.
Figure 13A:
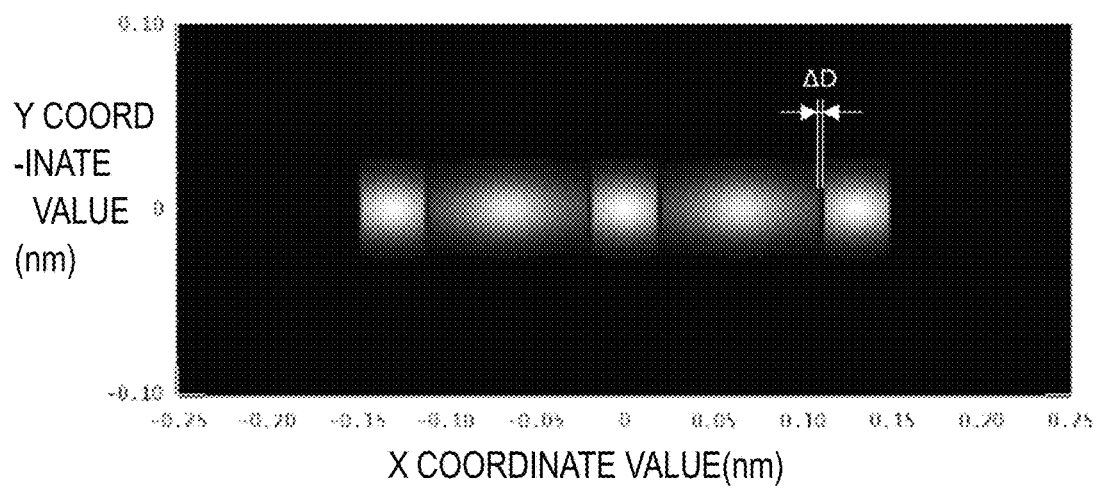
FIG. 13A is a view resulting from developing the intensity distribution of the laser light in the simulation in FIG. 11A on the image surface of the intermediate image.
Figure 13B:
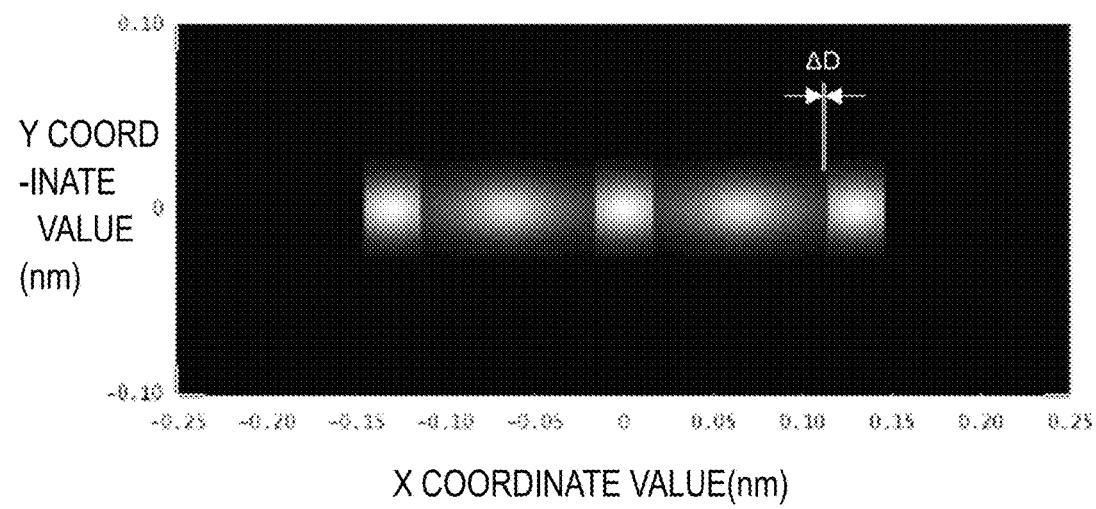
FIG. 13B is a view resulting from developing the intensity distribution of the laser light in the simulation in FIG. 11B on the image surface of the intermediate image.

FIG. 12A is a view resulting from developing the intensity distribution in the simulation in FIG. 10A (ΔS=0 μm) on the image surface (an X-Y coordinate plane) of the intermediate image. FIG. 12B is a view resulting from developing the intensity distribution in the simulation in FIG. 10B (ΔS=5 μm) on the image surface (the X-Y coordinate plane) of the intermediate image. FIG. 13A is a view resulting from developing the intensity distribution in the simulation in FIG. 11A (ΔS=10 μm) on the image surface (the X-Y coordinate plane) of the intermediate image. FIG. 13B is a view resulting from developing the intensity distribution in the simulation in FIG. 11B (ΔS=15 μm) on the image surface (the X-Y coordinate plane) of the intermediate image. A horizontal axis of each of FIG. 12A to FIG. 13B is the same as the horizontal axis of each of the graphs in FIG. 10A to FIG. 11B, and a vertical axis of each of FIG. 12A to FIG. 13B indicates a scan position of the laser light in the vertical direction (the Y-axis direction) of screen 108 as a Y-coordinate value. Here, a center position in the Y-axis direction of a beam spot was set as an origin (y=0) of the Y-coordinate value of the vertical axis. In each of the distribution views of FIG. 12A to FIG. 13B, the intensity of the light is higher as the color approaches white, and the intensity of the light is lower as the color approaches black.

As shown in FIG. 10A, it can be found that when displacement distance ΔS was set to zero, the intensity of the laser light remarkably decreased at the boundary of adjacent first lens portions 108a. In this case, as shown in FIG. 12A, in the intensity distribution of the laser light in the image surface (the X-Y plane) of the intermediate image, there was caused a region having width ΔD where the intensity remarkably decreased at a position corresponding to the boundary of adjacent first lens portions 108a.

In contrast, as shown in FIG. 10B, when displacement distance ΔS was set to 5 μm, the range where the intensity of the laser light remarkably decreased became a little narrower than that when displacement distance ΔS was set to zero. In this case, as shown in FIG. 12B, while in the intensity distribution of the laser light in the image surface (the X-Y plane) of the intermediate image, the region was caused where the intensity remarkably decreased at the position corresponding to the boundary of adjacent first lens portions 108a, width ΔD was suppressed, as compared with in the case of FIG. 12A.

Moreover, as shown in FIG. 11A, when displacement distance ΔS was set to 10 μm, the decrease in the light intensity at the boundary of adjacent first lens portions 108a was suppressed. In this case, as shown in FIG. 13A, in the intensity distribution of the laser light in the image surface (the X-Y plane) of the intermediate image, width ΔD of the region where the intensity decreased was further suppressed.

Moreover, as shown in FIG. 11B, when displacement distance ΔS was set to 15 μm, the decrease in the light intensity at the boundary of adjacent first lens portions 108a was suppressed still further. In this case, as shown in FIG. 13B, in the intensity distribution of the laser light in the image surface (the X-Y plane) of the intermediate image, width ΔD was so remarkably suppressed that the region where the intensity decreased was substantially absent.

In this manner, the tops of adjacent first lens portions 108a are mutually displaced by about 15 μm in the thickness direction of screen 108, which can eliminate the remarkable decrease in the light intensity at the boundary between adjacent first lens portions 108a. Similarly, with regard to second lens portions 108b formed in the emission surface of screen 108, it is also assumed that the tops of adjacent second lens portions 108b are mutually displaced by a predetermined distance in the thickness direction of screen 108, which can eliminate the remarkable decrease in the light intensity at the boundary between adjacent second lens portions 108b. In this manner, suppressing the remarkable decrease in the light intensity at each boundary position can eliminate the portions having low light intensities in a lattice shape on image 30 as shown in FIG. 9A. This can suppress the granular feeling on image 30, and thus enhance quality of image 30

It is assumed that even when the tops of the adjacent lens portions are mutually displaced in this manner, since displacement distance ΔS is about 15 μm, a blur or the like is not caused in image 30. Displacement distance ΔS may be set to a value that can effectively suppress the granular feeling in image 30 in a range where a blur or the like is not caused in image 30.

Combining the configuration described in the present verification with the configuration in which screen 108 is inclined as described in the foregoing exemplary embodiment can simultaneously realize the suppression of the interference fringe and the granular feeling, both of which are caused in image 30.

However, the configuration described in the present verification does not necessarily have to be combined with the configuration in which screen 108 is disposed in the inclined manner, and when only the suppression of the granular feeling is aimed at, only the configuration described in the present verification may be applied. Moreover, the configuration described in the present verification does not necessarily have to be applied to both first lens portions 108a and second lens portions 108b, and may be applied to only any one of first lens portions 108a and second lens portions 108b. For example, only in first lens portions 108a, the tops of the adjacent lens portions may be mutually displaced in the thickness direction of screen 108. In this case, the remarkable decrease in the light intensity at the boundaries of first lens portions 108a can be effectively suppressed.

Effects of Exemplary Embodiment

As described above, according to the present exemplary embodiment, the following effects are exerted.

As shown in FIG. 7A to FIG. 7C, by setting inclination angle θ1 of rows AR1 to ARn of lens regions La1 with respect to main scan directions MD1 to MDn to the predetermined value, the interference fringe caused in image 30 can be effectively suppressed. Thus, with the extremely simple configuration, the quality of image 30 can be effectively enhanced.

Inclination angle θ1 may be set to 15° to 20°, inclusive, as described in the verification in the above-described "Relation between pitch and inclination angle". This can effectively suppress the interference fringe caused in image 30.

Moreover, in the verification of the above-described "Suppression of granular feeling", as described with reference to FIG. 9A to FIG. 13B, the tops of adjacent first lens portions 108a are mutually displaced by the predetermined displacement distance in the thickness direction of screen 108, and further, the tops of adjacent second lens portions 108b are mutually displaced by the predetermined displacement distance in the thickness direction of screen 108, which can suppress the granular feeling caused in image 30. Thus, with the simple configuration, the quality of image 30 can be effectively enhanced.

Moreover, in the present exemplary embodiment, the pitch of lens regions La1 in main scan directions MD1 to MDn (the pitch of first lens portions 108a) are set larger than the beam diameter of the laser light in main scan directions MD1 to MDn. This can suppress speckle caused in image 30.

Other Exemplary Embodiments

The interference fringe in image 30 is caused by shift of the beams from second lens portions 108b. Therefore, in the above-described exemplary embodiment, in order to suppress the interference fringe, the configuration is used in which second lens portions 108b are inclined at inclination angle θ1 with respect to main scan directions MD1 to MDn. However, inclining second lens portions 108b in this manner makes slightly ununiform distribution of light quantity on image 30. In addition, in the above-described exemplary embodiment, since not only second lens portions 108b but first lens portions 108a are inclined, the ununiformity of the distribution of the light quantity on image 30 becomes still larger. First lens portions 108a, not participating in the occurrence and suppression of the interference fringe, are preferably arranged in a state perpendicular to the main scan directions of the scan lines.

Consequently, in another exemplary embodiment, screen 108 is beforehand configured so that first lens portions 108a are arranged in the state perpendicular to the main scan directions of the scan lines in a state where screen 108 is installed.

Figure 14A:
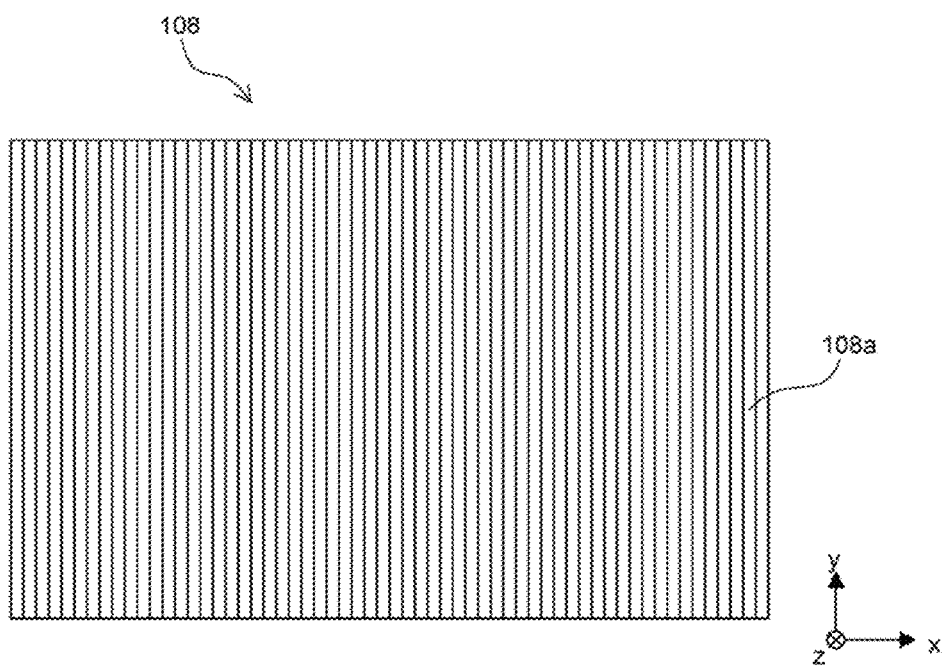
FIG. 14A is a view schematically showing a state of a screen according to another exemplary embodiment as seen from an incident side of laser light.
Figure 14B:
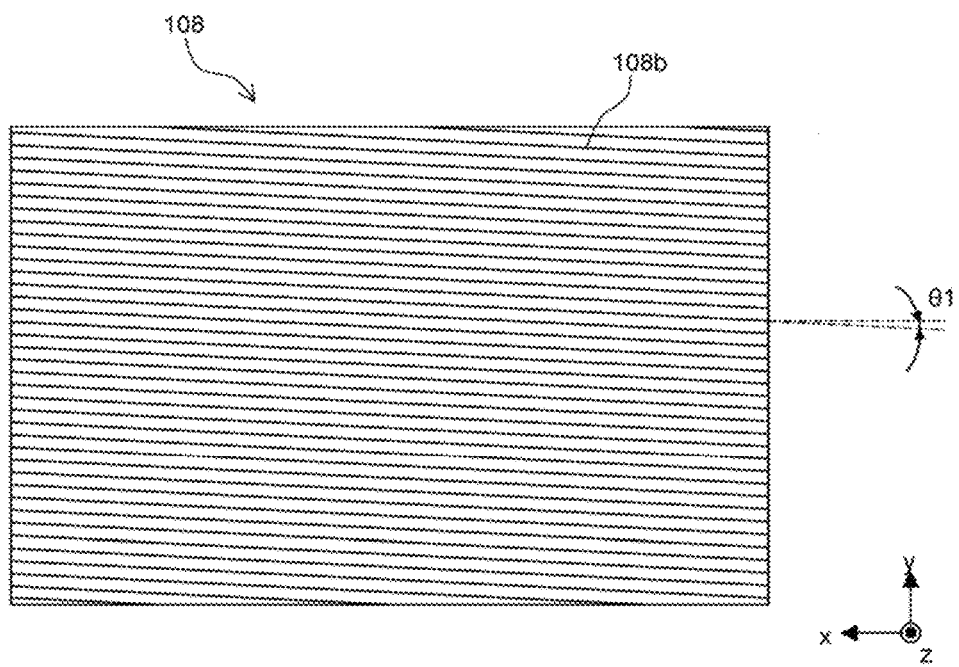
FIG. 14B is a view schematically showing a state of the screen according to the other exemplary embodiment as seen from an emission side of the laser light.

FIG. 14A and FIG. 14B are views schematically showing a state of screen 108 according to the other exemplary embodiment as seen from the incident side and the emission side of the laser light, respectively.

As shown in FIG. 14A, first lens portions 108a are arranged in screen 108 so as to extend in the vertical direction (the Y-axis direction)

As shown in FIG. 14B, second lens portions 108b are arranged in screen 108 so as to be inclined at inclination angle θ1 with respect to the horizontal direction (the X-axis direction). Here, inclination angle θ1 is an inclination angle that can suppress the interference fringe on image 30 most, similar to the above-described exemplary embodiment.

Screen 108 is installed so that the horizontal direction (the X-axis direction) is parallel to the main scan directions (the X-axis direction) described in the above-described exemplary embodiment. Thus, according to this configuration, second lens portions 108b are inclined at inclination angle θ1 with respect to the main scan directions of the scan lines, and first lens portions 108a are arranged so as to extend perpendicularly to the main scan directions of the scan lines. This can effectively suppress the interference fringe in image 30, and can suppress the ununiformity of light quantity on image 30 due to the inclination of first lens portions 108a from the direction perpendicular to the main scan directions. Thus, according to the present other exemplary embodiment, the quality of image 30 can be enhanced still further, as compared with the above-described exemplary embodiment.

In the present other exemplary embodiment as well, as verified in the above-described "Relation between pitch and inclination angle", inclination angle θ1 may be set to the range of 15° to 20°, inclusive.

Moreover, in the present other exemplary embodiment as well, the configuration described in the verification of the above-described "Suppression of granular feeling", that is, the configuration in which the adjacent lens portions are displaced in the thickness direction of screen 108 may be applied. This can suppress the interference fringe, and can further suppress the granular feeling caused in the image.

Modification Example 1

Although the exemplary embodiments of the present disclosure have been described above, the present disclosure is not limited to the above-described exemplary embodiments, and moreover, a variety of modifications can be made to application examples according to the present disclosure besides the above-described exemplary embodiments.

For example, in the above-described exemplary embodiments, first lens portions 108a and second lens portions 108b are arranged on the incident surface and the emission surface of screen 108, respectively; however, screen 108 may have a configuration in which a lens group for diverging the laser light in the X-axis direction and the Y-axis direction is disposed on either one of the incident surface and the emission surface of screen 108.

Figure 15A:
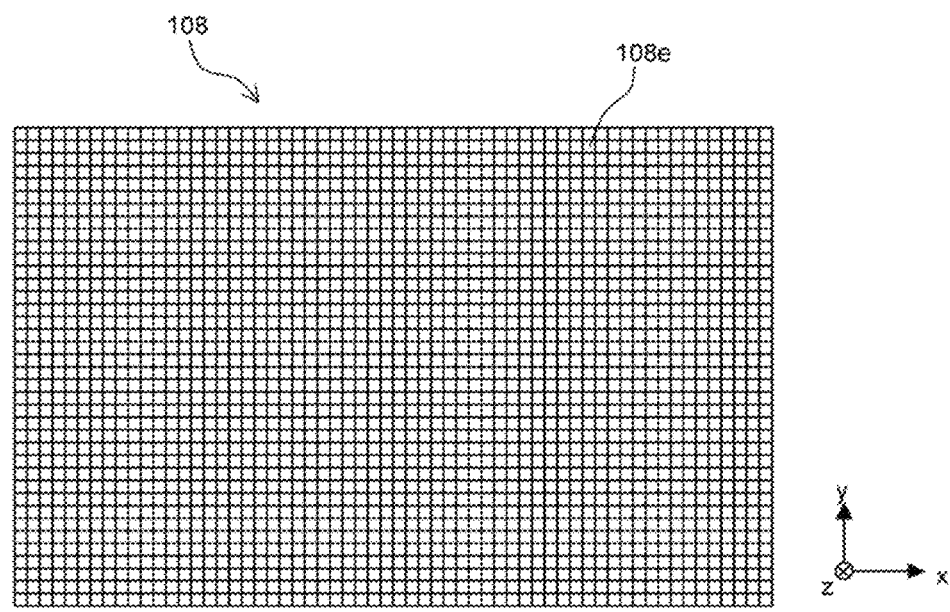
FIG. 15A is a view schematically showing a state of a screen according to a first modification example as seen from the incident side of the laser light.
Figure 15B:
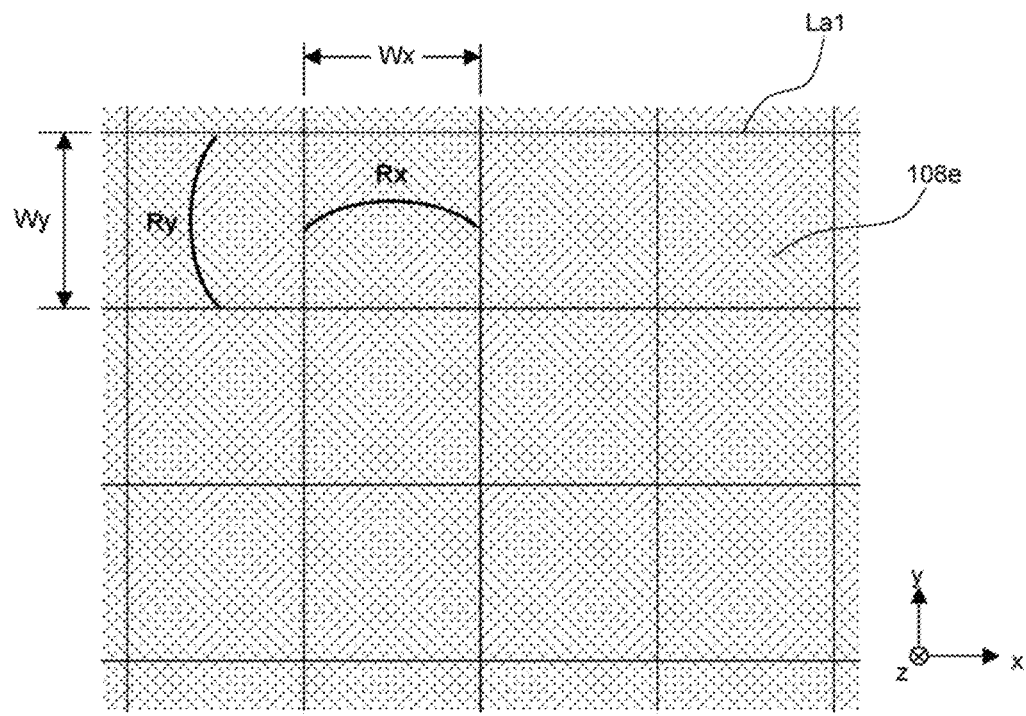
FIG. 15B is a partially enlarged view of the screen according to the modification example.

FIG. 15A is a view showing a configuration example where, on the incident surface of screen 108, there are arranged a plurality of lens portions 108e (a microlens array) for diverging the laser light in the X-axis direction and the Y-axis direction. FIG. 15B is an enlarged view of a partial region of FIG. 15A as seen from a Z-axis positive side.

In this configuration, one lens portion 108e corresponds to one lens region La1 shown in FIG. 4.

As shown in FIG. 15A and FIG. 15B, rectangular lens portions 108e in plan view are formed on the incident surface of screen 108 so as to be arrayed by a predetermined number in the horizontal direction parallel to the X axis and by a predetermined number in the vertical direction parallel to the Y axis. Widths Wx in the horizontal direction of respective lens portions 108e are equal to one another, and vertical widths Wy in the vertical direction of respective lens portions 108e are also equal to one another. Both of width Wx and width Wy are about 50 μm. In the example of FIG. 15B, width Wx and width Wy are set equal to each other; however, width Wx and width Wy may be different from each other.

In each of lens portions 108e, curvature radius Rx in the X-axis direction and curvature radius Ry in the Y-axis direction are different from each other. Here, curvature radius Rx is set smaller than curvature radius Ry. Accordingly, a curvature of lens portions 108e in the X-axis direction is larger than a curvature of lens portions 108e in the Y-axis direction. The curvatures of lens portions 108e are set as described above, by which similar to the above-described exemplary embodiments, the laser light transmitted through respective lens portions 108e can be efficiently guided to the oblong region (the eye-box region) around the position of eye 2a of driver 2. The curvatures of lens portions 108e are determined in accordance with the shape of the eye-box region.

In the present modification example as well, similar to the above-described exemplary embodiment, disposing screen 108 in the inclined manner can suppress the interference fringe caused in image 30. This can enhance the quality of image 30.

In the modification example as well, similar to the above-described other exemplary embodiment, lens regions La1 may be arranged in screen 108 so that the rows of the lens regions La1 in the Y-axis direction are perpendicular to the main scan directions in the state where the rows of lens regions La1 in the X-axis direction are inclined at inclination angle θ1 with respect to the main scan directions of the laser light.

Modification Example 2

In the above-described exemplary embodiments, the position of screen 108 is fixed; however, in image display operation, screen 108 may be moved in the Z-axis direction.

Figure 16:
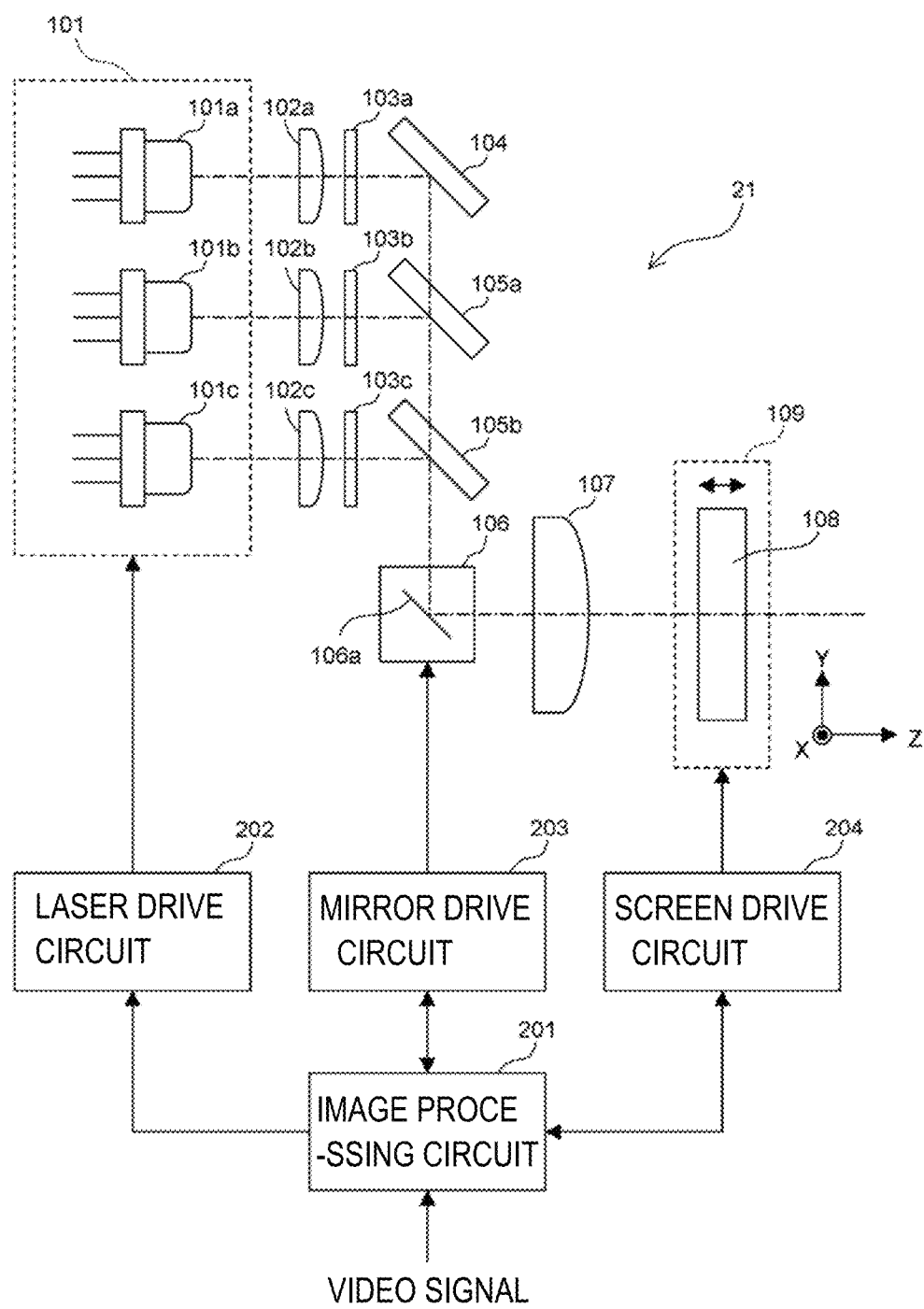
FIG. 16 is a diagram of an irradiation light generator and a circuit used in the irradiation light generator in an image display device according to a second modification example.

FIG. 16 is a diagram showing configurations of irradiation light generator 21 of image display device 20 according to a second modification example and of a circuit used in irradiation light generator 21.

As shown in FIG. 16, in the present modification example, drive unit 109 and screen drive circuit 204 are added, as compared with the configuration in FIG. 2. Drive unit 109 reciprocates screen 108 in a direction (the Z-axis direction) parallel to a traveling direction of the laser light. Drive unit 109 is configured of, for example, an actuator using a coil and a magnet. For example, a holder that holds screen 108 is supported by a base via a plate spring so as to be movable in the direction (Z-axis direction) parallel to the traveling direction of the laser light. The coil is installed on a holder side, and the magnet is installed on a base side. Screen drive circuit 204 drives screen 108 in response to the control signal from image processing circuit 201.

Figure 17A:
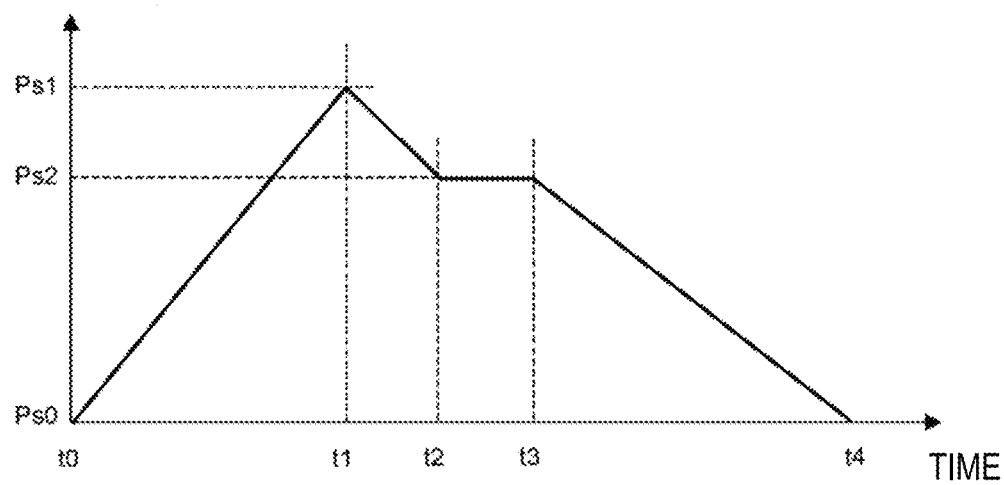
FIG. 17A is a diagram showing an example of a process for moving a screen according to the second modification example.
Figure 17B:
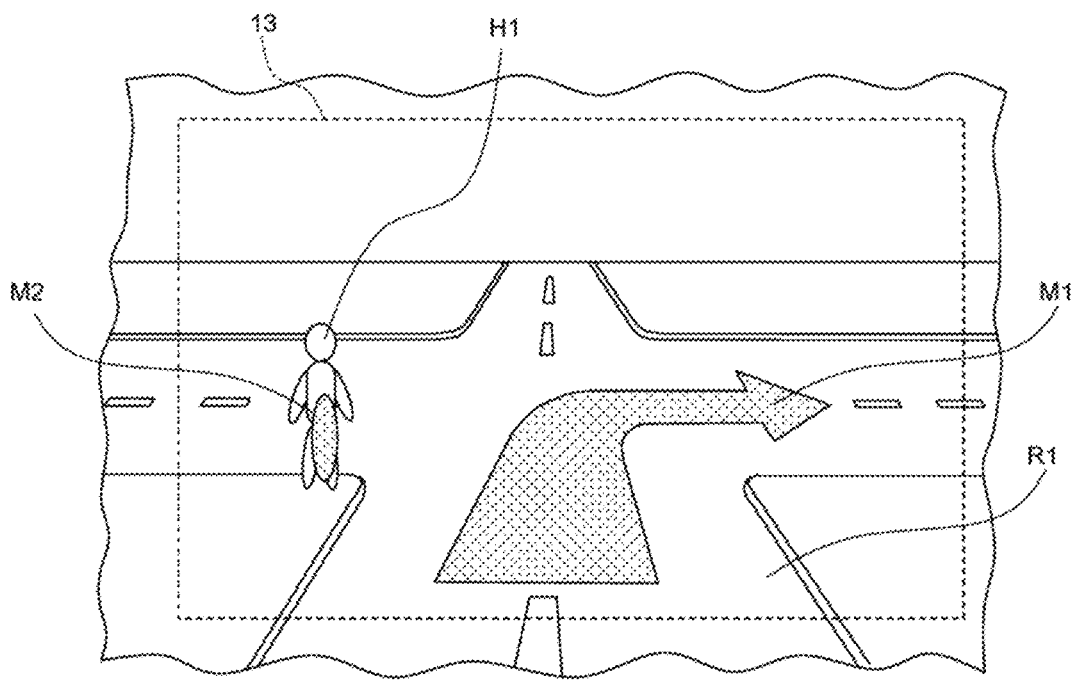
FIG. 17B is a view showing an example of an image displayed by moving the screen in an image display device according to the second modification example.

FIG. 17A is a diagram showing an example of a process for moving screen 108 according to the second modification example, and FIG. 17B is a view showing an example of an image displayed by moving screen 108 in image display device 20 according to the second modification example.

As shown in FIG. 17A, screen 108 is repeatedly moved from time t0 to time t4, which are taken as one cycle. Between time t0 and time t1, screen 108 is moved from initial position Ps0 to farthest position Ps1, and between time t1 to time t4, screen 108 is returned from farthest position Ps1 to initial position Ps0. A movement cycle of screen 108, that is, a time from time t0 to time t4 is, for example, 1/60 second.

In FIG. 17B, the period from time t0 to time t1 is a period for displaying depth image M1 extending in the depth direction, and the period from time t1 to time t4 is a period for displaying vertical image M2 extending in the vertical direction. In the example of FIG. 17B, depth image M1 is an arrow for suggesting a direction, in which passenger vehicle 1 should turn on road R1, to driver 2 by a navigation function, and vertical image M2 is a marking for alerting driver 2 to the fact that pedestrian H1 is present. For example, depth image M1 and vertical image M2 are displayed in colors different from each other.

During the period from time t0 to time t1, screen 108 is linearly moved from initial position Ps0 to farthest position Ps1. When screen 108 moves, with this movement, a position at which the virtual image in front of windshield 12 is formed moves in the depth direction. Therefore, when screen 108 is at each position in the depth direction of depth image M1, laser light sources 101a to 101c are caused to emit light at timing corresponding to depth image M1, on the scan lines corresponding to depth image M1, by which depth image M1 as shown in FIG. 17B can be displayed as a virtual image in front of projection region 13 of windshield 12.

Meanwhile, vertical image M2 does not change in the depth direction, but spreads only in the vertical direction, and accordingly, it is necessary to fix screen 108 at a position corresponding to vertical image M2 and generate the virtual image. Stop position Ps2 in FIG. 17A is a position of screen 108 corresponding to the depth position of vertical image M2. During a period of returning from farthest position Ps1 to initial position Ps0, screen 108 is stopped at stop position Ps2 for a while from time t2 to time t3. In this period, laser light sources 101a to 101c on the scan lines corresponding to vertical image M2 are caused to emit light at timing corresponding to vertical image M2, by which vertical image M2 as shown in FIG. 17B can be displayed as a virtual image in front of projection region 13 on windshield 12.

The above-described control is performed by image processing circuit 201 shown in FIG. 16. By this control, in the period from time t0 to time t4, depth image M1 and vertical image M2 are displayed as virtual images. In the above-described control, there occurs a shift between the display timing of depth image M1 and the display timing of vertical image M2; however, since this shift is an extremely short time, driver 2 recognizes an image in which depth image M1 and vertical image M2 are superimposed on each other. In this way, in front of projection region 13, driver 2 can see the images (depth image M1, vertical image M2), which are based on the video signal, while superimposing the images on a scene including road R1 and pedestrian H1.

In FIG. 17B, since vertical image M2 is one, stop position Ps2 of screen 108 is set to one in the process of FIG. 17A; however, if there are a plurality of vertical images M2, a plurality of stop positions are set accordingly in the process of FIG. 17A. However, in the process of FIG. 17A, since the period from time t0 to time t4 is constant, and time t4 is unchanged, a movement speed of screen 108 (an inclination of a waveform in FIG. 17A) before and after the stop positions is modified in accordance with increase or decrease in a number of stop positions.

In the present second modification example, similar to the above-described exemplary embodiment, disposing screen 108 so as to be inclined at inclination angle θ1 can suppress the interference fringe caused in image 30.

As described above, correction lens 107 is designed so that a focal depth near screen 108 is about 3 mm to 5 mm. Therefore, as in the configuration of the second modification example, when screen 108 is moved in the Z-axis direction as well, the laser light can be properly focused on screen 108.

Other Modification Examples

While in the above-described exemplary embodiments, first lens portions 108a and second lens portions 108b are configured in a convex shape, first lens portions 108a and second lens portions 108b may be configured in a concave shape. In this case as well, inclining second lens portions 108b with respect to main scan directions MD1 to MDn can effectively suppress the interference fringe caused in image 30. Moreover, in this case as well, tops (deepest portions of concave surfaces) of adjacent first lens portions 108a are mutually displaced in the thickness direction of screen 108, and tops (deepest portions of concave surfaces) of adjacent second lens portions 108b are mutually displaced in the thickness direction of screen 108, which can suppress the granular feeling caused in image 30.

Moreover, first lens portions 108a or second lens portions 108b may have a shape in which concave surfaces and convex surfaces are arrayed alternately. In this case, even when the displacement distance in the thickness direction of screen 108 in the tops (the deepest portions of concave surfaces) of adjacent first lens portions 108a is made smaller, the granular feeling caused in image 30 can be suppressed.

Moreover, while in the above-described exemplary embodiment, as shown in FIG. 6C, screen 108 is inclined so that rows AR1 to ARn are inclined clockwise, screen 108 may be inclined so that rows AR1 to ARn are inclined counterclockwise.

Moreover, while in the configuration example of FIG. 9C, heights of every other first lens portions 108a in the X-axis direction are equal, the configuration in which the tops of adjacent first lens portions 108a are displaced is not limited thereto. For example, the tops of adjacent first lens portions 108a may be displaced in the thickness direction of screen 108 while setting the heights of every other first lens portions 108a in the X-axis direction so that the heights are equal. Second lens portions 108b can be modified similarly. Moreover, in the configuration in which the tops of first lens portions 108a are displaced by changing the curvature radius of first lens portions 108a can effectively bring about a similar effect.

Moreover, while in the above-described exemplary embodiment, as shown in FIG. 2, screen 108 is disposed so that the incident surface and the emission surface of screen 108 are perpendicular to the Z-axis, screen 108 may be disposed so as to be inclined in a direction parallel to the X-Z plane from the above-described state.

In the above-described exemplary embodiment, first lens portions 108a are formed on the incident surface of screen 108, and second lens portions 108b are formed on the emission surface of screen 108; however, the plurality of second lens portions 108b, which diverge the laser light in the Y-axis direction (the vertical direction), may be formed on the incident surface of screen 108, and the plurality of first lens portions 108a, which diverge the laser light in the X-axis direction (the horizontal direction), may be formed on the emission surface of screen 108. In this case as well, similar to the above-described exemplary embodiment, disposing screen 108 in the inclined manner can suppress the interference fringe caused in image 30.

Moreover, while in the above-described exemplary embodiment, scan lines L1 to Ln warp with respect to main scan directions MD1 to MDn, scan lines L1 to Ln may be parallel to main scan directions MD1 to MDn. For example, mirror 106a is controlled to simultaneously turn around both the tilt turning axis and the pan turning axis, by which the warp of scan lines L1 to Ln can be eliminated. In this case as well, similar to the above-described exemplary embodiment, disposing screen 108 in the inclined manner can suppress the interference fringe caused in image 30.

Moreover, while in the second modification example shown in FIG. 16, the configuration is such that screen 108 is moved in the Z-axis direction, a screen fixed at a predetermined position in the Z-axis direction is provided beside screen 108 moved in the Z-axis direction, and that these two screens are scanned with the laser light. In this case, similar to screen 108, the screen fixed at the predetermined position in the Z-axis direction is also disposed so that rows of lens regions along main scan directions are inclined at inclination angle θ1 with respect to the main scan directions. This can effectively suppress occurrence of an interference fringe in an image displayed by this screen.

In the above-described exemplary embodiment, one scan line is assigned to each of the rows of lens regions La1 lining up in the X-axis direction. That is, the pitch in the rows of lens regions La1 lining up in the X-axis direction is the same as the pitch of the scan lines. However, the pitch in the rows of lens regions La1 lining up in the X-axis direction and the pitch of the scan lines do not necessarily have to be equal, and both the pitches may be different from each other.

Moreover, while in the above-described exemplary embodiment, light source 101 is configured to include three laser light sources 101a to 101c, a multi-light emitting laser light source, in which a plurality of light emitting elements having different emission wavelengths are mounted on a substrate of one laser light source, may be used as light source 101. In this case, optical axes of laser light emitted from the respective light emitting elements are aligned by, for example, a wavelength-selective diffraction grating.

Moreover, while the above-described exemplary embodiments illustrates the example in which the present disclosure is applied to the head-up display mounted on passenger vehicle 1, the present disclosure is not limited to such an on-vehicle use, but is also applicable to other types of image display devices.

Moreover, the configurations of image display device 20 and irradiation light generator 21 are not limited to the configurations shown in FIG. 1C and FIG. 2, and FIG. 16, and are modifiable as appropriate. Furthermore, first lens portions 108a, second lens portions 108b, and lens portions 108e may be formed integrally with screen 108, or the configuration may be such that a transparent sheet having these lens portions is attached to a base material of screen 108.

In the exemplary embodiment of the present disclosure, microlens array screen with arranging lenses as square, so called "square lattice" microlens array, is used as shown in FIG. 4. Instead of "square lattice" microlens array, microlens array screen with arranging lenses as hexagonal, so called "hexagonal lattice" microlens array, can be used. The "hexagonal lattice" microlens array has the effect the same that "square lattice" microlens array has above discussions.

The exemplary embodiment of the present disclosure is modifiable in various ways as appropriate within the scope of the technical idea disclosed in the claims.

An image display device according to the present disclosure can effectively enhance display image quality with a simple configuration, and is thus useful on industrial applicability.

What is claimed is:

1. An image display device comprising:
   a light source configured to emit laser light;
   a screen configured to be two-dimensionally scanned with the laser light to draw an image on the screen;
   a scanning unit configured to scan the screen with the laser light;
   a drive unit configured to drive the scanning unit so that the laser light moves on the screen along a plurality of scan lines at predetermined intervals; and
   an optical system configured to generate a virtual image of the image drawn on the screen,
   wherein on the screen, a plurality of lens regions are arranged so as to line up in two directions different from each other, and
   rows in one of the two directions of the lens regions are respectively inclined relatively at a predetermined inclination angle, between but not including 0 degrees and 90 degrees, with respect to main scan directions of the laser light to the screen.

2. The image display device according to claim 1, wherein the inclination angle is set to 15° to 20°, inclusive.

3. The image display device according to claim 1, wherein rows of the lens regions in an other of the two directions respectively extend in a direction perpendicular to the main scan directions.

4. The image display device according to claim 1, wherein the screen includes:
   a plurality of first lens portions extending in a first direction parallel to one of the two directions in one of an incident surface and an emission surface of the laser light, the plurality of first lens portions being configured to diverge the laser light only in a direction perpendicular to the first direction and
   a plurality of second lens portions extending in a second direction parallel to the other of the two directions in the other of the incident surface and the emission surface of the laser light, the plurality of second lens portions being configured to diverge the laser light only in a direction perpendicular to the second direction,
   wherein a region where each of the first lens portions and a corresponding one of the second lens portions overlap each other as seen in an incident direction of the laser light is one of the plurality of lens regions.

5. The image display device according to claim 4, wherein tops of adjacent first lens portions among the first lens portions shift from each other by a predetermined distance along a thickness of the screen.

6. The image display device according to claim 4, wherein tops of adjacent second lens portions shift from each other by a predetermined distance in a thickness direction of the screen.

7. The image display device according to claim 1, wherein a pitch of the lens regions in each of the main scan directions is set larger than a beam diameter of the laser light in the relevant main scan directions.

* * * * *